United States Patent
Shimura

(10) Patent No.: US 10,274,358 B2
(45) Date of Patent: Apr. 30, 2019

(54) ELECTROMAGNETIC FLOW METER

(71) Applicant: Yokogawa Electric Corporation, Tokyo (JP)

(72) Inventor: Toru Shimura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 327 days.

(21) Appl. No.: 15/386,016

(22) Filed: Dec. 21, 2016

(65) Prior Publication Data

US 2017/0184440 A1    Jun. 29, 2017

(30) Foreign Application Priority Data

Dec. 25, 2015  (JP) .................................. 2015-254711

(51) Int. Cl.
*G01F 25/00* (2006.01)
*G01F 1/60* (2006.01)

(52) U.S. Cl.
CPC ............ *G01F 25/0007* (2013.01); *G01F 1/60* (2013.01)

(58) Field of Classification Search
USPC ................. 324/306, 453; 73/861.12, 861.356
See application file for complete search history.

(56) References Cited

U.S. PATENT DOCUMENTS

2011/0056307 A1* 3/2011 Yamamoto ............... G01F 1/58
73/861.12

FOREIGN PATENT DOCUMENTS

JP    2002-195861 A    7/2002

* cited by examiner

*Primary Examiner* — Vincent Q Nguyen
(74) *Attorney, Agent, or Firm* — Sughrue Mion, PLLC

(57) ABSTRACT

A first detection electrode that outputs a first flow rate signal and a second detection electrode that outputs a second flow rate signal, a differential circuit that outputs a differential flow rate signal obtained by obtaining a difference between the first flow rate signal and the second flow rate signal, an AC signal generation circuit that causes a first AC current to flow between the first detection electrode and the ground electrode and causes a second AC current with a reverse phase at the same frequency as that of the first AC current to flow between the second detection electrode and the ground electrode, and a diagnosis unit that diagnoses an abnormality of at least either of the first detection electrode or the second detection electrode based on a differential flow rate signal.

13 Claims, 5 Drawing Sheets

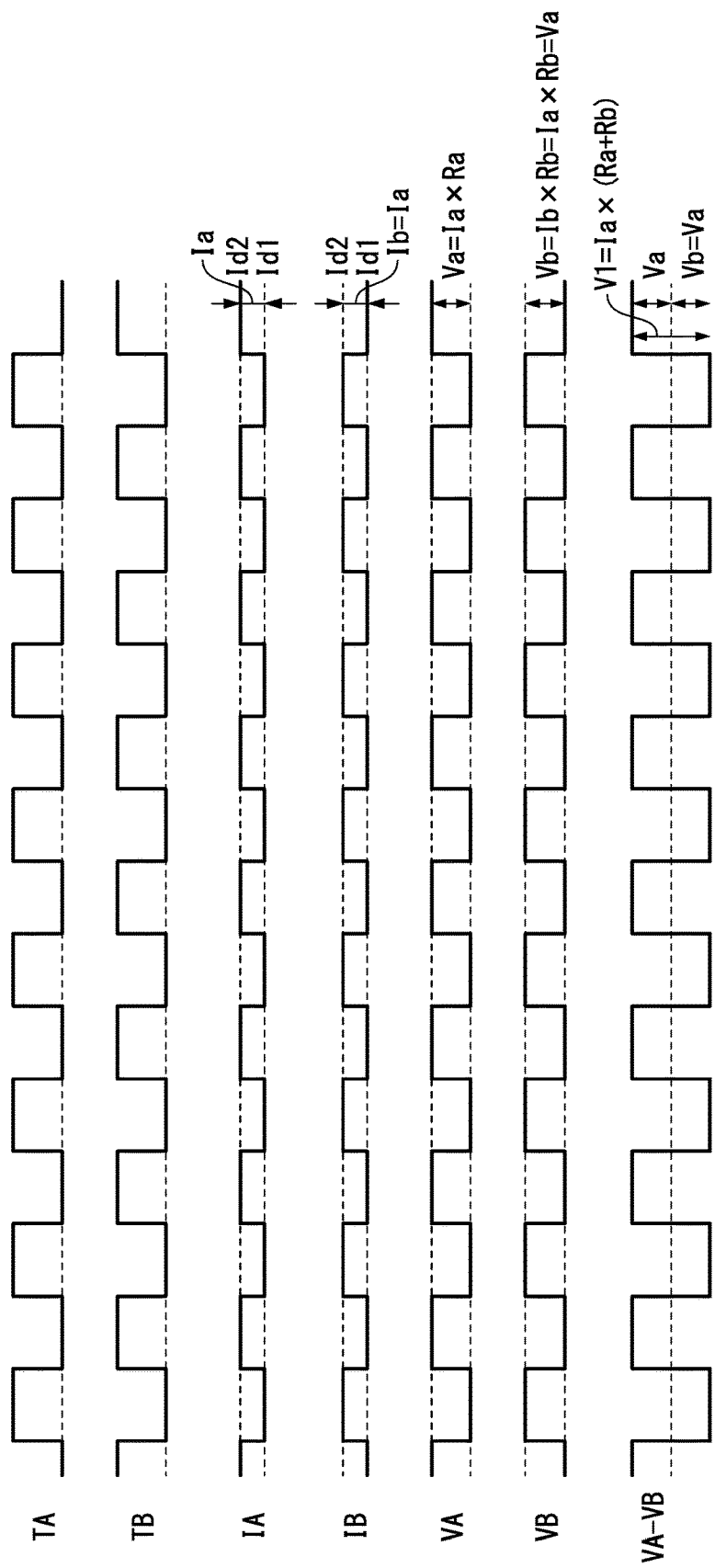

ELECTROMAGNETIC FLOW METER

BACKGROUND OF THE INVENTION

Field of the Invention

The present invention relates to an electromagnetic flow meter.

Priority is claimed on Japanese Patent Application No. 2015-254711, filed Dec. 25, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a plant with various facilities, a plurality of field devices (measurement devices or operating devices) are installed for the purpose of performing monitoring of a state in which each of the facilities disposed in the plant is working or control of an operation of the facilities. An electromagnetic flow meter that is one measurement device in the field devices is installed in a pipe or the like disposed in a plant, measures a flow rate of a conductive fluid flowing in the installed pipe, and outputs information on the measured flow rate. Information on a flow rate of fluid output by this electromagnetic flow meter is used for control when fluid is caused to flow in a pipe using a pump or a valve that is one operating device in the field devices (control of driving of the pump or opening and closing of the valve).

Further, in order to perform secure work in the plant, daily or regular checking work for respective facilities and work for coping with problems such as failures or malfunction are performed. This work includes work for maintaining the integrity of the field devices installed in the respective facilities, that is, checking work for enabling a working state of the facility by the field device to be accurately measured. Conventionally, various technologies for verifying the integrity of the field device have been proposed.

For example, Japanese Unexamined Patent Publication No. 2002-195861 discloses a technology of an electromagnetic flow meter that diagnoses insulation deterioration of a plurality of electrodes (measurement electrodes) disposed in a liquid in order to measure a flow rate. In the technology disclosed in Japanese Unexamined Patent Publication No. 2002-195861, a flow rate value is individually calculated for each of the measurement electrodes based on flow rate signals output from the respective measurement electrodes according to a detected flow rate of fluid, and insulation deterioration is diagnosed for each of the measurement electrodes based on a relative error value of the calculated flow rates.

In a configuration of the electromagnetic flow meter disclosed in Japanese Unexamined Patent Publication No. 2002-195861, a flow rate value of fluid that the electromagnetic flow meter outputs as a result of measurement is obtained by obtaining a difference between respective flow rate signals output from the measurement electrodes. In this case, a process of obtaining the difference between the respective flow rate signals is performed using a differential amplifier. Therefore, from the electromagnetic flow meter having the configuration disclosed in Japanese Unexamined Patent Publication No. 2002-195861, a flow rate value obtained in a state in which noise of an in-phase component (for example, commercial noise) included in each flow rate signal has been removed by the differential amplifier is output as a result of measurement.

However, in the configuration of the electromagnetic flow meter disclosed in Japanese Unexamined Patent Publication No. 2002-195861, an individual flow value for diagnosing insulation deterioration is directly obtained from the flow rate signals output from the respective measurement electrodes. That is, in the electromagnetic flow meter having the configuration disclosed in Japanese Unexamined Patent Publication No. 2002-195861, the individual flow rate values are obtained in a state in which noise such as commercial noise included in each flow rate signal has not been removed. In the flow rate signal that each measurement electrode outputs, it is conceivable that information on an actual flow rate of fluid which should inherently have been detected may be hidden by noise. Therefore, in the electromagnetic flow meter having the configuration disclosed in Japanese Unexamined Patent Publication No. 2002-195861, the individual flow rate values of each measurement electrode which should inherently have been obtained may not be able to be accurately determined due to an influence of noise included in each of the flow rate signals. Therefore, in the technology disclosed in Japanese Unexamined Patent Publication No. 2002-195861, there is a problem in that it is not possible to accurately diagnose a state of the insulation deterioration of each of the measurement electrodes of the electromagnetic flow meter.

SUMMARY OF THE INVENTION

The present invention provides an electromagnetic flow meter capable of accurately diagnosing an abnormality of electrodes for detecting a flow rate in the electromagnetic flow meter.

According to an aspect of the present invention, an electromagnetic flow meter (100, 200) is an electromagnetic flow meter that measures velocity of fluid that is a measurement target flowing in a magnetic field formed inside a measurement pipe, the electromagnetic flow meter including: a first detection electrode (1A) that detects electromotive force generated by the fluid to output a first flow rate signal having a magnitude of the detected electromotive force, and a second detection electrode (1B) that detects electromotive force generated by the fluid to output a second flow rate signal having a magnitude of the detected electromotive force; a differential circuit (3) that outputs a differential flow rate signal obtained by obtaining a difference between the first flow rate signal and the second flow rate signal; an AC signal generation circuit (10A, 10B, 11A, 11B) that causes a first AC current to flow between the first detection electrode and a ground electrode (1E) and causes a second AC current with a reverse phase at the same frequency as that of the first AC current to flow between the second detection electrode and the ground electrode; and a diagnosis unit (6) that calculates a first resistance value between the first detection electrode and the second detection electrode based on the differential flow rate signal from the first flow rate signal and the second flow rate signal output in a state in which the first AC current and the second AC current are caused to flow, and diagnoses an abnormality of at least either of the first detection electrode or the second detection electrode based on the calculated first resistance value.

Further, the diagnosis unit in the electromagnetic flow meter may include a timing signal generation unit that outputs an excitation current timing signal indicating a frequency of an excitation current output by an excitation circuit that forms the magnetic field in the measurement pipe, a first AC current timing signal indicating a frequency of the first AC current, and a second AC current timing signal indicating a frequency of the second AC current. The frequency of the first AC current timing signal and the second AC current timing signal may be an integer multiple of the frequency of the excitation current timing signal.

Further, the diagnosis unit in the electromagnetic flow meter may include a timing signal generation unit that outputs an excitation current timing signal indicating a frequency of an excitation current output by an excitation circuit that forms the magnetic field in the measurement pipe, and a first AC current timing signal indicating a frequency of the first AC current. The AC signal generation circuit may cause the first AC current at a frequency expressed by the first AC current timing signal to flow between the first detection electrode and the ground electrode, and cause the second AC current with a reverse phase at the same frequency as a frequency expressed by the first AC current timing signal to flow between the second detection electrode and the ground electrode. A frequency of the first AC current timing signal may be an integer multiple of the frequency of the excitation current timing signal.

Further, the diagnosis unit in the electromagnetic flow meter may diagnose an abnormality of at least one of the first detection electrode and the second detection electrode based on a first resistance value difference that is a difference between the first resistance value calculated in an installation step of the electromagnetic flow meter and the first resistance value calculated in an operation step of the electromagnetic flow meter.

Further, the diagnosis unit in the electromagnetic flow meter may determine that at least either of the first detection electrode or the second detection electrode is abnormal when the first resistance value difference is smaller than a predetermined threshold.

Further, the diagnosis unit in the electromagnetic flow meter may calculate a second resistance value corresponding to the first detection electrode based on the differential flow rate signal from the first flow rate signal and the second flow rate signal output in a state in which only the first AC current is caused to flow, calculate a third resistance value corresponding to the second detection electrode based on the differential flow rate signal from the first flow rate signal and the second flow rate signal output in a state in which only the second AC current is caused to flow, and perform at least one of diagnosis of an abnormality of the first detection electrode based on the second resistance value and diagnosis of an abnormality of the second detection electrode based on the third resistance value.

Further, the diagnosis unit in the electromagnetic flow meter may perform at least one of diagnosis of an abnormality of the first detection electrode based on a second resistance value difference that is a difference between the second resistance value calculated in an installation step of the electromagnetic flow meter and the second resistance value calculated in an operation step of the electromagnetic flow meter and diagnosis of an abnormality of the second detection electrode based on a third resistance value difference that is a difference between the third resistance value calculated in the installation step and the third resistance value calculated in the operation step.

Further, the diagnosis unit in the electromagnetic flow meter may determine that the second detection electrode is abnormal when the second resistance value difference is within a predetermined range and the third resistance value difference is smaller than a predetermined threshold value.

Further, the diagnosis unit in the electromagnetic flow meter may determine that the first detection electrode is abnormal when the second resistance value difference is smaller than a predetermined threshold value and the third resistance value difference is within a predetermined range.

Further, the diagnosis unit in the electromagnetic flow meter may diagnose an abnormality of the first detection electrode or the second detection electrode using a combination of a first operation resistance value that is the first resistance value calculated in the operation step of the electromagnetic flow meter, a second operation resistance value that is the second resistance value calculated in the operation step, and a third operation resistance value that is the third resistance value calculated in the operation step.

Further, the diagnosis unit in the electromagnetic flow meter may determine that the first detection electrode is abnormal in any one of a case in which half the first operation resistance value is greater than the second operation resistance value, a case in which a difference between the first operation resistance value and the third operation resistance value is within a predetermined range, and a case in which a difference between the second operation resistance value and the third operation resistance value is smaller than a predetermined threshold value.

Further, the diagnosis unit in the electromagnetic flow meter may determine that the second detection electrode is abnormal in any one of a case in which half the first operation resistance value is greater than the third operation resistance value, a case in which a difference between the first operation resistance value and the second operation resistance value is within a predetermined range, and a case in which a difference between the second operation resistance value and the third operation resistance value is greater than a predetermined threshold value.

Further, according to an aspect of the present invention, an electromagnetic flow meter is an electromagnetic flow meter that measures velocity of fluid that is a measurement target flowing in a magnetic field formed inside a measurement pipe, the electromagnetic flow meter including: a first detection electrode that detects electromotive force generated by the fluid to output a first flow rate signal having a magnitude of the detected electromotive force, and a second detection electrode that detects electromotive force generated by the fluid to output a second flow rate signal having a magnitude of the detected electromotive force; a differential circuit that outputs a differential flow rate signal obtained by obtaining a difference between the first flow rate signal and the second flow rate signal; an AC signal generation circuit that causes a first AC current to flow between the first detection electrode and a ground electrode and causes a second AC current with a reverse phase at the same frequency as that of the first AC current to flow between the second detection electrode and the ground electrode; and a diagnosis unit that calculates a first resistance value corresponding to the first detection electrode based on the differential flow rate signal from the first flow rate signal and the second flow rate signal output in a state in which only the first AC current is caused to flow, calculates a second resistance value corresponding to the second detection electrode based on the differential flow rate signal from the first flow rate signal and the second flow rate signal output in a state in which only the second AC current is caused to flow, and performs at least one of diagnosis of an abnormality of the first detection electrode based on the first resistance value and diagnosis of an abnormality of the second detection electrode based on the second resistance value.

According to the present invention, there is an effect that an abnormality of electrodes for detecting a flow rate in the electromagnetic flow meter can be accurately diagnosed.

BRIEF DESCRIPTION OF THE DRAWINGS

The above features and advantages of the present invention will be more apparent from the following description of certain preferred embodiments taken in conjunction with the accompanying drawings.

FIG. 2 is a timing chart illustrating an example of timings of respective signals for diagnosing an abnormality of an electrode in the electromagnetic flow meter of the first embodiment.

DETAILED DESCRIPTION OF THE INVENTION

First Embodiment

Figure 1:
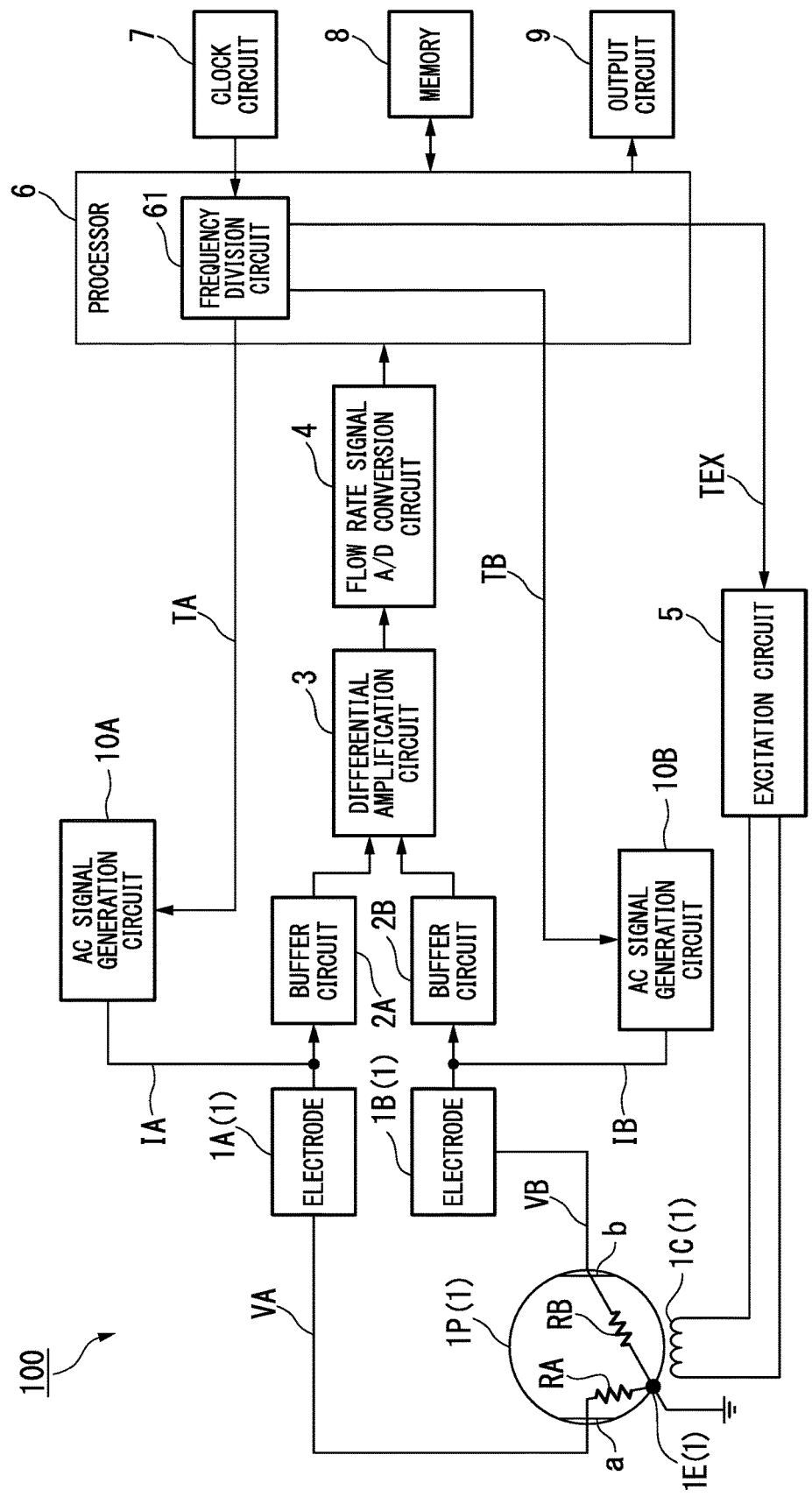
FIG. 1 is a block diagram illustrating a schematic configuration of an electromagnetic flow meter according to a first embodiment of the present invention.

Hereinafter, embodiments of the present invention will be described with reference to the drawings. FIG. 1 is a block diagram illustrating a schematic configuration of an electromagnetic flow meter according to a first embodiment of the present invention. The electromagnetic flow meter 100 includes a sensor 1, a buffer circuit 2A, a buffer circuit 2B, a differential amplification circuit (a differential circuit) 3, a flow rate signal A/D conversion circuit 4, an excitation circuit 5, a processor (a diagnosis unit) 6, a clock circuit 7, a memory 8, an output circuit 9, an AC signal generation circuit 10A, and an AC signal generation circuit 10B. The sensor 1 includes a pair of detection electrodes (detection electrode 1A and detection electrode 1B), an excitation coil 1C, a ground electrode 1E, and a measurement pipe 1P. Further, the processor 6 includes a frequency division circuit 61.

The electromagnetic flow meter 100 is a field device that is installed in a facility such as pipe disposed in a plant. The plant includes a plant that manages and controls a wellhead such as a gas field or an oil field and its surroundings, a plant that manages and controls power generation such as hydro, thermal and nuclear power generation, a plant that manages and controls environmental power generation such as solar or wind power generation, and a plant that manages and controls water and sewage, a dam, or the like, in addition to an industrial plant that performs petroleum refining and production of chemical products. In the following description, the electromagnetic flow meter 100 is installed in a pipe disposed in a plant, and measures velocity (fluid velocity) of conductive liquid (for example, a product or a semi-finished product in a liquid form such as industrial water or chemicals) that is a fluid that is a measurement target flowing in the measurement pipe 1P.

The electromagnetic flow meter 100 calculates a fluid velocity of the liquid flowing in the measurement pipe 1P based on the flow rate signal (voltage signal) measured by the sensor 1, and outputs a measurement signal indicating the calculated fluid velocity. In the electromagnetic flow meter 100, the excitation coil 1C constituting the sensor 1 is disposed outside the measurement pipe 1P, and each of the detection electrode 1A and the detection electrode 1B that are a pair of detection electrodes constituting the sensor 1 is disposed in a position opposite to a surface with which the liquid is in contact inside the measurement pipe 1P (a position a or a position b illustrated in FIG. 1). However, in FIG. 1, for ease of description, each of the detection electrode 1A disposed in the position a and the detection electrode 1S disposed in the position b is extracted and shown in a position adjacent to the corresponding buffer circuit 2A or buffer circuit 2B. Further, in the electromagnetic flow meter 100, the ground electrode 1E constituting the sensor 1 is disposed in a position of a ground level of the measurement pipe 1P. It is preferable for the ground electrode 1E to be disposed in a position in which a distance between the detection electrode 1A and the ground electrode 1E and a distance between the detection electrode 1B and the ground electrode 1E become the same distance.

The sensor 1 forms a magnetic field with respect to the measurement pipe 1P using the excitation coil 1C, and detects an electromotive force (voltage) generated due to the liquid flowing in the magnetic field formed by the excitation coil 1C, that is, the liquid flowing in the measurement pipe 1P, using each of the detection electrode 1A and the detection electrode 1B. The detection electrode 1A outputs a flow rate signal having a magnitude (voltage value) of the detected electromotive force to the corresponding buffer circuit 2A. Further, the detection electrode 1B outputs a flow rate signal having a magnitude (voltage value) of the detected electromotive force to the corresponding buffer circuit 2B.

The excitation circuit 5 is an excitation circuit that outputs an AC excitation current required to form the magnetic field with respect to the measurement pipe 1P to the excitation coil 1C constituting the sensor 1. The excitation circuit 5 outputs an excitation current at a frequency (for example, 300 Hz or lower) of an excitation current timing signal TEX output from the frequency division circuit 61 included the processor 6 to the excitation coil 1C. Thus, the magnetic field according to the frequency of the excitation current timing signal TEX is formed around the measurement pipe 1P by the excitation coil 1C. A flow rate signal having the magnitude (voltage value) of the electromotive force generated due to the liquid flowing in the magnetic field formed by the excitation coil 1C according to the excitation current output by the excitation circuit 5 is output from each of the detection electrode 1A and the detection electrode 1B to the buffer circuit 2A or the buffer circuit 2B corresponding thereto.

Each of the buffer circuit 2A and the buffer circuit 2B is a buffer circuit for transferring the flow rate signal output from the detection electrode 1A or the detection electrode 1B corresponding thereto to the differential amplification circuit 3. Each of the buffer circuit 2A and the buffer circuit 2B converts impedance of the flow rate signal output from the detection electrode 1A or the detection electrode 1B corresponding thereto, and outputs the flow rate signal after impedance conversion to the differential amplification circuit 3.

The differential amplification circuit 3 obtains a difference between the flow rate signals after impedance conversion output from the buffer circuit 2A and the buffer circuit 2B, amplifies a signal level of the flow rate signal of the difference, and outputs the flow rate signal to the flow rate signal A/D conversion circuit 4. In the following description, the flow rate signal of the difference output from the differential amplification circuit 3 to the flow rate signal A/D conversion circuit 4 is referred to as a "differential flow rate signal". By the differential amplification circuit 3 obtaining the difference between the respective flow rate signals output from the buffer circuit 2A and the buffer circuit 2B, for example, a differential flow rate signal in which noise of an in-phase component such as commercial noise has been removed, which is included in the respective flow rate signals, is output to the flow rate signal A/D conversion circuit 4 in the electromagnetic flow meter 100.

The flow rate signal A/D conversion circuit 4 performs analog-to-digital conversion on the differential flow rate signal (analog signal) output from the differential amplification circuit 3 and generates a digital signal (hereinafter referred to as a "differential digital flow rate signal") having a digital value according to the magnitude of the signal level of the flow rate signal detected by the sensor 1. The flow rate signal A/D conversion circuit 4 outputs the generated differential digital flow rate signal to the processor 6. The differential digital flow rate signal output by the flow rate signal A/D conversion circuit 4 may be used for a calculation process of calculating a fluid velocity of the liquid flowing in the measurement pipe 1P in a normal measurement operation of the electromagnetic flow meter 100. Further, the differential digital flow rate signal output by the flow rate signal A/D conversion circuit 4 may be used for a calculation process of diagnosing an abnormality of at least either of the detection electrode 1A or the detection electrode 1B in an electrode diagnosis operation in the electromagnetic flow meter 100.

The clock circuit 7 oscillates a clock and supplies a signal of the oscillated clock to the processor 6 as a clock signal by which the processor 6 is operated. The clock signal that the clock circuit 7 supplies to the processor 6 may be a plurality of clock signals, such as a signal of an original oscillation clock that is oscillated and a signal of a frequency-divided clock obtained by dividing the original oscillation clock.

The processor 6 is a control unit that is operated based on the clock signal output from the clock circuit 7, and controls the respective components included in the electromagnetic flow meter 100. The processor 6 includes, for example, a central processing unit (CPU), and controls all of the respective components included in the electromagnetic flow meter 100 according to an application program or data for realizing functions of the electromagnetic flow meter 100. Further, the processor 6 is a calculation processing unit that performs a predetermined calculation process of calculating a fluid velocity in the normal measurement operation of the electromagnetic flow meter 100, and a calculation process of diagnosing an abnormality of at least either of the detection electrode 1A or the detection electrode 1B in the electrode diagnosis operation in the electromagnetic flow meter 100 according to the executed application program. The processor 6 outputs a digital signal indicating a result of the calculation process, that is, the fluid velocity of the liquid flowing in the measurement pipe 1P or a result of diagnosing an abnormality of at least either of the detection electrode 1A or the detection electrode 1B to the output circuit 9.

Further, the processor 6 generates respective timing signals by which the excitation circuit 5, the AC signal generation circuit 10A, and the AC signal generation circuit 10B operate using the frequency division circuit 61, and outputs the respective generated timing signals. In this case, the frequency division circuit 61 divides the clock signal input from the clock circuit 7 and generates timing signals at frequencies required for respective operations of the excitation circuit 5, the AC signal generation circuit 10A, and the AC signal generation circuit 10B. More specifically, the frequency division circuit 61 generates respective timing signals including the excitation current timing signal TEX output to the excitation circuit 5, an AC current timing signal TA output to the AC signal generation circuit 10A, and an AC current timing signal TB output to the AC signal generation circuit 10B by dividing the clock signal input from the clock circuit 7 by a predetermined division ratio. The frequency division circuit 61 sets the AC current timing signal TA and the AC current timing signal TB to a frequency of an integer multiple (for example, twice) of the frequency of the excitation current timing signal TEX. Further, the frequency division circuit 61 sets the AC current timing signal TA and the AC current timing signal TB to signals with reverse polarities (opposite phases, that is, phases shifted by 180°), which are also referred to as "reverse phases") at the same frequency. The frequency division circuit 61 outputs the respective generated timing signals (the excitation current timing signal TEX, the AC current timing signal TA, and the AC current timing signal TB) to the excitation circuit 5, the AC signal generation circuit 10A, and the AC signal generation circuit 10B, respectively.

The memory 8 is a storage unit that stores an application program to be executed by the processor 6, or data or the like during execution of the calculation process. The memory 8 includes, for example, various memories such as a read only memory (ROM), a random access memory (RAM), or a flash memory. The memory 8 performs storage (writing) of data or an output (reading) of data under control of the processor 6.

The output circuit 9 outputs the digital signal after the calculation process output from the processor 6 (the fluid velocity of the liquid flowing in the measurement pipe 1P or a result of diagnosing an abnormality of at least either of the detection electrode 1A or the detection electrode 1B), as a measurement signal obtained by measurement in the electromagnetic flow meter 100, to outside of the electromagnetic flow meter 100. The output circuit 9 may convert a digital value indicated by the digital signal output from the processor 6 into, for example, into a digital value in a predetermined range, and output the digital value as a measurement signal of the digital signal. Further, the output circuit 9 may convert the measurement signal into, for example, a DC analog signal in a range of 4 mA to 20 mA, and output the DC analog signal as an analog signal (current signal). In this case, the output circuit 9 performs digital-to-analog conversion to convert the digital value indicated by the digital signal output from the processor 6 into a DC analog signal expressed by a signal level in a range from 4 mA to 20 mA.

Further, the output circuit 9 may output the measurement signal of the DC analog signal to, for example, outside of the electromagnetic flow meter 100 such as a control device that controls an operation of a facility in the plant, through communication using a communication network built to be dedicated to the inside of a plant. The communication network built in the plant is, for example, a communication network that performs transmission and reception of data or the like between the electromagnetic flow meter 100 and the control device using various communication standards or schemes, such as an industrial wireless standard such as ISA100.11a, a wireless standard such as a sensor network system, a communication standard that is a combination of wireless and wired such as Wireless/Wired HART (registered trademark), a communication standard of a master/ slave scheme such as MODBUS (registered trademark), or a field bus standard such as FOUNDATION (registered trademark) field bus or PROFIBUS (PROCESS FIELD BUS) (registered trademark).

The communication network may be, for example, a communication network in which transmission and reception are performed between the electromagnetic flow meter 100 and the control device according to a wireless standard of general WiFi (registered trademark). In this case, the output circuit 9 can output (transmit) the digital signal output from the processor 6, as a measurement signal of the digital signal, to the outside of the electromagnetic flow meter 100 such as a control device without performing digital-to-analog conversion on a DC analog signal.

Each of the AC signal generation circuit 10A and the AC signal generation circuit 10B is a synchronous rectification circuit that outputs an AC signal (AC current) at a predetermined signal level (current value) between the corresponding detection electrode 1A or detection electrode 1B and a pipe (ground level) in the electrode diagnosis operation of the electromagnetic flow meter 100. When an abnormality of the detection electrode 1A is diagnosed in the electromagnetic flow meter 100, the AC signal generation circuit 10A outputs an AC signal having a predetermined current value at a frequency of the AC current timing signal TA output from the frequency division circuit 61 included in the processor 6, and causes the AC current to flow between the corresponding detection electrode 1A and the ground electrode 1E. Further, when an abnormality of the detection electrode 1B is diagnosed in the electromagnetic flow meter 100, the AC signal generation circuit 10B outputs an AC signal having a predetermined current value at a frequency of the AC current timing signal TB output from the frequency division circuit 61 included in the processor 6, and causes the AC current to flow between the corresponding detection electrode 1B and the ground electrode 1E.

Here, the AC current timing signal TA input to the AC signal generation circuit 10A and the AC current timing signal TB input to the AC signal generation circuit 10B are timing signals output from the same frequency division circuit 61 that outputs the excitation current timing signal TEX to the excitation circuit 5 as described above, and a frequency thereof is a frequency that is an integer multiple of the frequency of the excitation current timing signal TEX. The AC current timing signal TA and the AC current timing signal TB have reverse phases. Therefore, the AC signals that the AC signal generation circuit 10A and the AC signal generation circuit 10B output between the detection electrode 1A or the detection electrode 1B corresponding thereto and the ground electrode 1E are AC signals with opposite phase synchronized (with a phase) at a frequency that is an integer multiple (for example, two times) of the frequency (for example, 300 Hz or lower) of the excitation current that the excitation circuit 5 outputs to the excitation coil 1C. Therefore, the AC signals that the AC signal generation circuit 10A and the AC signal generation circuit 10B output are signals which do not influence a magnetic field formed in the measurement pipe 1P by the excitation coil 1C.

It is preferable for the electrode diagnosis operation in the electromagnetic flow meter 100 to be performed in a period in or a timing at which the normal measurement operation is not performed. For example, the normal measurement operation and the electrode diagnosis operation may be alternately performed. However, as described above, the AC signals that the AC signal generation circuit 10A and the AC signal generation circuit 10B output are signals that do not influence the magnetic field formed in the measurement pipe 1P by the excitation coil 1C. Therefore, in the electromagnetic flow meter 100, it is possible to diagnose an abnormality of at least either of the detection electrode 1A or the detection electrode 1B even when the normal measurement operation of measuring the fluid velocity of the liquid flowing in the magnetic field formed by the excitation coil 1C is performed without the respective AC signals influencing the flow rate signal (DC voltage) that the detection electrode 1A and the detection electrode 1B constituting the sensor 1 output according to the fluid velocity of the liquid. That is, in the electromagnetic flow meter 100, both of the detection value (voltage value) expressed by a DC voltage detected in the normal measurement operation and the detection value (voltage value) expressed by an AC voltage detected in the electrode diagnosis operation of diagnosing an abnormality of at least either of the detection electrode 1A or the detection electrode 1B may be included in the flow rate signal output by the detection electrode 1A and the detection electrode 1B. Thus, in the electromagnetic flow meter 100, it is possible to simultaneously perform the normal measurement operation and the electrode diagnosis operation. In the electromagnetic flow meter 100, it is preferable for the signal levels (current values) of the respective AC signals not to be unnecessarily high, that is, for the signal levels (current values) of the AC respective signals to be low.

If an AC signal is output between the detection electrode 1A and the ground electrode 1E by the AC signal generation circuit 10A (if the AC current flows), the electromotive force (voltage value) generated by resistance RA (hereinafter referred to as "liquid resistance RA") of the liquid between the detection electrode 1A and the ground electrode 1E in the measurement pipe 1P is detected by the detection electrode 1A, and a flow rate signal having a magnitude (voltage value) of the detected electromotive force is output from the detection electrode 1A. Further, if an AC signal is output between the detection electrode 1B and the ground electrode 1E by the AC signal generation circuit 10B (if the AC current flows), the electromotive force (voltage value) generated by resistance RB (hereinafter referred to as "liquid resistance RB") of the liquid between the detection electrode 1B and the ground electrode 1E in the measurement pipe 1P is detected by the detection electrode 1B, and a flow rate signal having a magnitude (voltage value) of the detected electromotive force is output from the detection electrode 1B.

In the normal measurement operation of the electromagnetic flow meter 100 in which each of the AC signal generation circuit 10A and the AC signal generation circuit 10B does not output the AC signal (does not cause an AC current to flow), that is, in a case in which the electromagnetic flow meter 100 measures the fluid velocity of the liquid flowing in the measurement pipe 1P, electromotive force (voltage value) generated by the resistance of the liquid flowing between the detection electrode 1A and the detection electrode 1B in the measurement pipe 1P is detected by each of the detection electrode 1A and the detection electrode 1B. Each of the detection electrode 1A and the detection electrode 1B outputs a flow rate signal having a magnitude (voltage value) of the detected electromotive force.

Next, each operation in the electromagnetic flow meter 100 will be described. First, a normal measurement operation of measuring the fluid velocity of the liquid flowing in the measurement pipe 1P in the electromagnetic flow meter 100 will be described. In the normal measurement operation, the electromagnetic flow meter 100 detects electromotive force (voltage) generated due to the liquid flowing in the magnetic field formed by the excitation coil 1C using a pair of detection electrodes (the detection electrode 1A and the detection electrode 1B) in a state in which each of the AC signal generation circuit 10A and the AC signal generation circuit 10B does not output an AC signal (an AC current does not flow). The differential amplification circuit 3 obtains a difference between the flow rate signals output by the detection electrode 1A and the detection electrode 1B, and outputs a differential flow rate signal in which noise of an in-phase component has been removed, and the flow rate signal A/D conversion circuit 4 outputs a differential digital flow rate signal obtained by performing analog-digital conversion on the differential flow rate signal (analog signal). Thereafter, the processor 6 calculates a fluid velocity based on the differential digital flow rate signal output by the flow rate signal A/D conversion circuit 4, and the output circuit 9 outputs the fluid velocity to the outside of the electromagnetic flow meter 100 as a measurement signal. The normal measurement operation of the electromagnetic flow meter 100 is the same as a measurement operation for measuring a fluid velocity of liquid in a general electromagnetic flow meter. Therefore, detailed description of the normal measurement operation of the electromagnetic flow meter 100 will be omitted.

Subsequently, an electrode diagnosis operation of diagnosing an abnormality of at least either of the detection electrode 1A or the detection electrode 1B in the electromagnetic flow meter 100 will be described. In the electrode diagnosis operation of the electromagnetic flow meter 100, each of the AC signal generation circuit 10A and the AC signal generation circuit 10B outputs an AC signal and causes each AC current to flow between the detection electrode 1A or the detection electrode 1B corresponding thereto and the ground electrode 1E. Thus, each of the detection electrode 1A and the detection electrode 1B detects the electromotive force (voltage value) generated due to the liquid resistance RA or liquid resistance RB of the liquid between the detection electrode 1A or the detection electrode 1B and the ground electrode 1E in a magnetic field formed by the excitation coil 1C, and outputs a flow rate signal of a magnitude (voltage value) of the detected electromotive force. Then, similar to the normal measurement operation of the electromagnetic flow meter 100, the differential amplification circuit 3 obtains a difference between the flow rate signals output by the detection electrode 1A and the detection electrode 1B and outputs a differential flow rate signal in which noise of an in-phase component has been removed, and the flow rate signal A/D conversion circuit 4 outputs a differential digital flow rate signal obtained by performing analog-digital conversion on the differential flow rate signal (analog signal). Thereafter, the processor 6 calculates a resistance value of at least either of the detection electrode 1A or the detection electrode 1B based on the differential digital flow rate signal output by the flow rate signal A/D conversion circuit 4, and diagnoses an abnormality of each of the detection electrode 1A and the detection electrode 1B based on the calculated resistance value. The processor 6 outputs a result of diagnosing the abnormality of at least either of the detection electrode 1A or the detection electrode 1B to the output circuit 9, and the output circuit 9 outputs the result to the outside of the electromagnetic flow meter 100 as a measurement signal (a diagnosis result signal).

The electrode diagnosis operation in the electromagnetic flow meter 100 will be described herein in greater detail. FIG. 2 is a timing chart illustrating an example of timings of respective signals for diagnosing an abnormality of the detection electrode (at least either of the detection electrode 1A or the detection electrode 1B) in the electromagnetic flow meter 100 in the first embodiment. In FIG. 2, timings and signal levels of respective signals when an abnormality of the detection electrode 1A and the detection electrode 1B is diagnosed in the electrode diagnosis operation are illustrated in connection with signals output by the frequency division circuit 61, the AC signal generation circuit 10A, the AC signal generation circuit 10B, the detection electrode 1A, the detection electrode 1B, and the differential amplification circuit 3. As described above, in the electromagnetic flow meter 100, the diagnosis of the electrode may also be performed when the normal measurement operation is performed. Therefore, in a case in which the diagnosis of the electrode in the electromagnetic flow meter 100 is performed when liquid flows in the measurement pipe 1P, electromotive forces (voltage value) generated due to the liquid flowing in the measurement pipe 1P are also simultaneously detected, and are included in the flow rate signals output by the detection electrode 1A and the detection electrode 1B. However, in the following description, for ease of description, it is assumed that the electromotive force (voltage value) due to the flow of the liquid is not included in the flow rate signal output by each of the detection electrode 1A and the detection electrode 1B, that is, the liquid is not flowing in the measurement pipe 1P.

In the following description, an AC signal that the AC signal generation circuit 10A outputs between the detection electrode 1A and the ground electrode 1E is referred to as an "AC signal IA", a signal level (current value) of the AC signal IA is referred to as an "AC current Ia", a flow rate signal detected and output by the detection electrode 1A is referred to as a "flow rate signal VA", a signal level (voltage value) of the flow rate signal VA is referred to as a "detection voltage Va", and a resistance value of the liquid resistance RA is referred to as "electrode resistance Ra". Further, an AC signal that the AC signal generation circuit 10B outputs between the detection electrode 1B and the ground electrode 1E is referred to as an "AC signal IB", a signal level (current value) of the AC signal TB is referred to as an "AC current Ib", a flow rate signal detected and output by the detection electrode 1B is referred to as a "flow rate signal VB", a signal level (voltage value) of the flow rate signal VB is referred to as a "detection voltage Vb", and a resistance value of the liquid resistance RB is referred to as "electrode resistance Rb".

In FIG. 2, a timing of the AC current timing signal TA and the AC current timing signal TB that the frequency division circuit 61 included in the processor 6 outputs to the AC signal generation circuit 10A and the AC signal generation circuit 10B, respectively, is illustrated. Further, in FIG. 2, the timings of the AC signal IA and the AC signal TB that the AC signal generation circuit 10A and the AC signal generation circuit 10B output between the detection electrode 1A or the detection electrode 1B corresponding thereto and the ground electrode 1E according to the AC current timing signal TA or the AC current timing signal TB are illustrated. In FIG. 2, the AC signal IA in which current value=Id1 and current value=Id2 are alternately switched according to the AC current timing signal TA is illustrated, and the AC signal IB with a reverse phase in which current value=Id1 and current value=Id2 are alternately switched with current values opposite to that of the AC signal IA according to the AC current timing signal TB is illustrated. Further, in FIG. 2, timings of the flow rate signal VA and the flow rate signal VB that the detection electrode 1A and the detection electrode 1B detect and output due to the output of the AC signal IA or the AC signal IB are illustrated. In FIG. 2, the signal levels (voltage values) of the flow rate signal VA and the flow rate signal VB, that is, the detection voltage Va and the detection voltage Vb are schematically illustrated using a height of the flow rate signal VA and the flow rate signal VB. Further, in FIG. 2, a timing of a differential flow rate signal (hereinafter referred to as a "differential flow rate signal VA−VB") in which the noise of the in-phase component has been removed by obtaining the difference between the flow rate signal VA and the flow rate signal VB output by the detection electrode 1A and the detection electrode 1B in the differential amplification circuit 3 is illustrated, and a signal level (voltage value) of the differential flow rate signal VA−VB is schematically illustrated using a height thereof In FIG. 2, for ease of description, an amplification factor for amplification after the difference between the flow rate signal VA and the flow rate signal VB is obtained in the differential amplification circuit 3 is "1".

An operation in a case in which an abnormality of the detection electrode 1A and the detection electrode 1B is diagnosed in the electrode diagnosis operation will be described with reference to the timing of the signals illustrated in FIG. 2. As described above, in the electrode diagnosis operation of the electromagnetic flow meter 100, the AC signal generation circuit 10A outputs the AC signal IA according to the AC current timing signal TA, and causes an AC current of the AC current Ia to flow between the detection electrode 1A and the ground electrode 1E. Further, in the electrode diagnosis operation of the electromagnetic flow meter 100, the AC signal generation circuit 10B outputs the AC signal IB according to the AC current timing signal TB and causes an AC current of an AC current Ib to flow between the detection electrode 1B and the ground electrode 1E.

Accordingly, the detection electrode 1A detects the electromotive force (voltage value) generated due to the liquid resistance RA and outputs the flow rate signal VA of the detection voltage Va. Further, the detection electrode 1B detects the electromotive force (voltage value) generated due to the liquid resistance RB and outputs the flow rate signal VB of the detection voltage Vb. As illustrated in FIG. 2, since the AC signal IA and the AC signal IB are AC signals with opposite phases, the flow rate signal VA and the flow rate signal VB are flow rate signals with opposite phases. The detection voltage Va and the detection voltage Vb have a relationship of Equation (1) below. Accordingly, the electrode resistance Ra that is the resistance value of the liquid resistance RA and the electrode resistance Rb that is the resistance value of the liquid resistance RB can be calculated using Equation (2) below from the AC current Ia caused to flow by the AC signal generation circuit 10A and the detection voltage Va output from the detection electrode 1A, and the AC current Ib caused to flow by the AC signal generation circuit 10B and the detection voltage Vb output from the detection electrode 1B.

$$Va = Ia \times Ra$$

$$Vb = Ib \times Rb \qquad (1)$$

$$Ra = Va/Ia$$

$$Rb = Vb/Ib \qquad (2)$$

Further, in the electrode diagnosis operation of the electromagnetic flow meter 100, the differential amplification circuit 3 outputs a differential flow rate signal VA−VB in which the noise of the in-phase component has been removed by obtaining a difference between the flow rate signal VA output from the detection electrode 1A and the flow rate signal VB output from the detection electrode 1B, similar to the normal measurement operation of the electromagnetic flow meter 100. A signal level (voltage value) (hereinafter referred to as a "detection voltage V1") of the differential flow rate signal VA−VB output from the differential amplification circuit 3 is expressed using Equation (3) below from Equation (1) above.

$$V1 = Va - Vb \qquad (3)$$
$$= Ia \times Ra - Ib \times Rb$$

Here, the AC current timing signal TA input to the AC signal generation circuit 10A and the AC current timing signal TB input to the AC signal generation circuit 10B are timing signals with opposite phases, as described above (see FIG. 2). Therefore, as illustrated in FIG. 2, the AC signal IA and the AC signal IB become AC signals with opposite phases. However, since in both of the AC signal IA and the AC signal IB, the current value is switched between the current value=Id1 and the current value=Id2, the AC signal IA and the AC signal IB are at the same signal level (current value). Therefore, it can be said that the AC current Ia and the AC current Ib have a relationship of Equation (4) below.

$$Ia = -Ib \qquad (4)$$

Therefore, when Equation (4) above is applied to the detection voltage V1 expressed using Equation (3), the detection voltage V1 can be expressed using Equation (5).

$$V1 = Ia \times Ra - (-Ia) \times Rb \qquad (5)$$
$$= Ia \times (Ra + Rb)$$

If the resistance value (hereinafter referred to as "electrode resistance R1") of the liquid between the detection electrode 1A and the detection electrode 1B is expressed based on Equation (5) similar to Equation (2), the electrode resistance R1 can be expressed using Equation (6).

$$R1 = V1/Ia \qquad (6)$$
$$= Ra + Rb$$

It can be seen from Equation (6) above that the electrode resistance R1 that is the resistance value of the liquid between the detection electrode 1A and the detection electrode 1B is expressed by a sum of the electrode resistance Ra and the electrode resistance Rb.

Accordingly, the processor 6 calculates the electrode resistance R1 using Equations (2) and (6). The processor 6 diagnoses an abnormality of each of the detection electrode 1A and the detection electrode 1B based on the calculated electrode resistance R1. The ground electrode 1E is arranged in a position in which a distance between the detection electrode 1A and the ground electrode 1E is equal to a distance between the detection electrode 1B and the ground electrode 1E. Accordingly, if there is no abnormality in each of the detection electrode 1A and the detection electrode 1B (which are normal), it is assumed that the electrode resistance Ra and the electrode resistance Rb are substantially the same resistance values.

Thus, in the electromagnetic flow meter 100, in the electrode diagnosis operation, the AC current flows between the detection electrode 1A or the detection electrode 1B and the ground electrode 1E due to the AC signal generation circuit 10A and the AC signal generation circuit 10B, the electrode resistance R1 that is the resistance value of the liquid between the detection electrode 1A and the detection electrode 1B being calculated based on the flow rate signal output from each of the detection electrode 1A and the detection electrode 1B. In this case, in the electromagnetic flow meter 100, the differential amplification circuit 3 removes the noise of the in-phase component by obtaining the difference between the respective flow rate signals output from the detection electrode 1A and the detection electrode 1B, similar to the normal measurement operation. Thus, in the electromagnetic flow meter 100, the processor 6 can diagnose the abnormality of the detection electrode 1A and the detection electrode 1B more accurately than an electromagnetic flow meter of the related art.

In the diagnosis of the electrode in the electromagnetic flow meter 100, the electrode resistance R1 calculated in the installation step such as when the electromagnetic flow meter 100 is installed (mounted) in a facility is stored in the memory 8. The processor 6 diagnoses an abnormality of the detection electrode 1A and the detection electrode 1B based on the electrode resistance R1 calculated in the operation step such as when the electromagnetic flow meter 100 is installed and operated, that is, the electrode resistance R1 (hereinafter referred to "electrode resistance R1$n$") calculated in the electrode diagnosis that has been performed at this time, and the electrode resistance R1 stored in the memory 8.

Here, a case in which noise such as commercial noise is included in the flow rate signal VA detected and output by the detection electrode 1A and the flow rate signal VB detected and output by the detection electrode 1B in the diagnosis of the electrode performed in the operation step is considered. In the following description, a component (voltage value) of the noise included in the flow rate signal VA is referred to as "noise Na", and a component (voltage value) of the noise included in the flow rate signal VB is referred to as "noise Nb".

In a case in which the noise Na is included in the flow rate signal VA and the noise Nb is included in the flow rate signal VB, the detection voltage V1 (hereinafter referred to as a "detection voltage V1$n$") of the differential flow rate signal VA−VB output by the differential amplification circuit 3 can be expressed as in Equation (7) from Equation (3).

$$V1n=(Ia\times Ra+Na)-(Ib\times Rb+Nb) \quad (7)$$

In this case, the AC current Ia and the AC current Ib can be said to have a relationship of Equation (4). Therefore, when Equation (4) above is applied to the detection voltage V1$n$ expressed using Equation (7), the detection voltage V1$n$ can be expressed using Equation (8).

$$V1n=Ia\times(Ra+Rb)+(Na-Nb) \quad (8)$$

Here, the noise Na and the noise Nb are noises of an in-phase component. Therefore, it can be said that the noise Na and the noise Nb have a relationship of Equation (9) below.

$$Na\approx Nb \quad (9)$$

Therefore, it can be said from this that the component (the voltage value) of the same detection voltage V1 as in Equation (5) above included in Equation (8) above and the noise component (voltage value) have a relationship shown in Equation (10) below.

$$(Na-Nb)<<Ia\times(Ra+Rb) \quad (10)$$

It can be said from Equation (10) that Equation (8) above is equal to Equation (5) above. This indicates that, even when noise such as commercial noise is included in each of the flow rate signal VA output by the detection electrode 1A and the flow rate signal VB output by the detection electrode 1B, the differential amplification circuit 3 removes the noise of the in-phase component by obtaining the difference between the flow rate signal VA output from the detection electrode 1A and the flow rate signal VB output from the detection electrode 1B.

Thus, the processor 6 can calculate the electrode resistance R1$n$ that is a current resistance value of the liquid between the detection electrode 1A and the detection electrode 1B based on the flow rate signal VA and the flow rate signal VB output by the detection electrode 1A and the detection electrode 1B in the electrode diagnosis performed in the operation step, using the same calculation as in Equations (2) and (6). The processor 6 diagnoses the abnormality of the detection electrode 1A and the detection electrode 1B based on the calculated electrode resistance R1$n$ and the electrode resistance R1 calculated in the installation step and stored in the memory 8. This diagnosis may be performed, for example, according to whether a difference between the electrode resistance R1 and the electrode resistance R1$n$ is within a threshold value of the resistance value for determining that a predetermined detection electrode is abnormal. As a result of this determination, when the difference between the electrode resistance R1 and the electrode resistance R1$n$ is within a predetermined threshold value, it is determined that each of the detection electrode 1A and the detection electrode 1B is not abnormal, that is, each of the detection electrode 1A and the detection electrode 1B is normal, and a diagnosis result signal (measurement signal) indicating a result of the diagnosis is output to the outside of the electromagnetic flow meter 100. On the other hand, when the difference between the electrode resistance R1 and the electrode resistance R1$n$ is not within the predetermined threshold value, it is determined that at least either of the detection electrode 1A or the detection electrode 1B is abnormal, and a diagnosis result signal (measurement signal) indicating a result of the diagnosis is output to the outside of the electromagnetic flow meter 100.

Even when at least either of the detection electrode 1A or the detection electrode 1B is diagnosed to be abnormal in the electrode diagnosis operation using a comparison of the electrode resistance R1 with the electrode resistance R1$n$ described above, it is not diagnosed (not determined) in this step whether both of the detection electrode 1A and the detection electrode 1B are abnormal or whether any one of the electrode 1A and the detection electrode 1B is abnormal. In the electromagnetic flow meter 100, it can be diagnosed (determined) whether both of the detection electrode 1A and the detection electrode 1B is abnormal or whether any one of the electrode 1A and the detection electrode 1B is abnormal, that is, abnormalities of the detection electrode 1A and the detection electrode 1B can be separately diagnosed for each detection electrode.

Figure 3A:
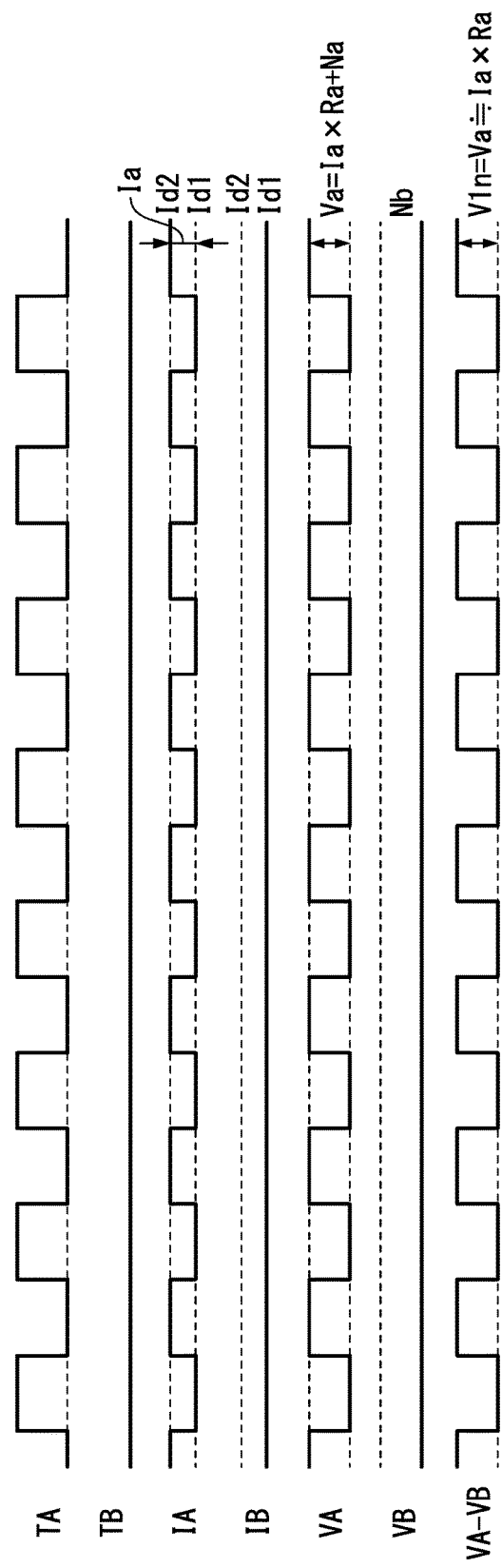
FIGS. 3A and 3B are timing charts illustrating an example of timings of respective signals for diagnosing an abnormality of one of electrodes in the electromagnetic flow meter of the first embodiment.
Figure 3B:
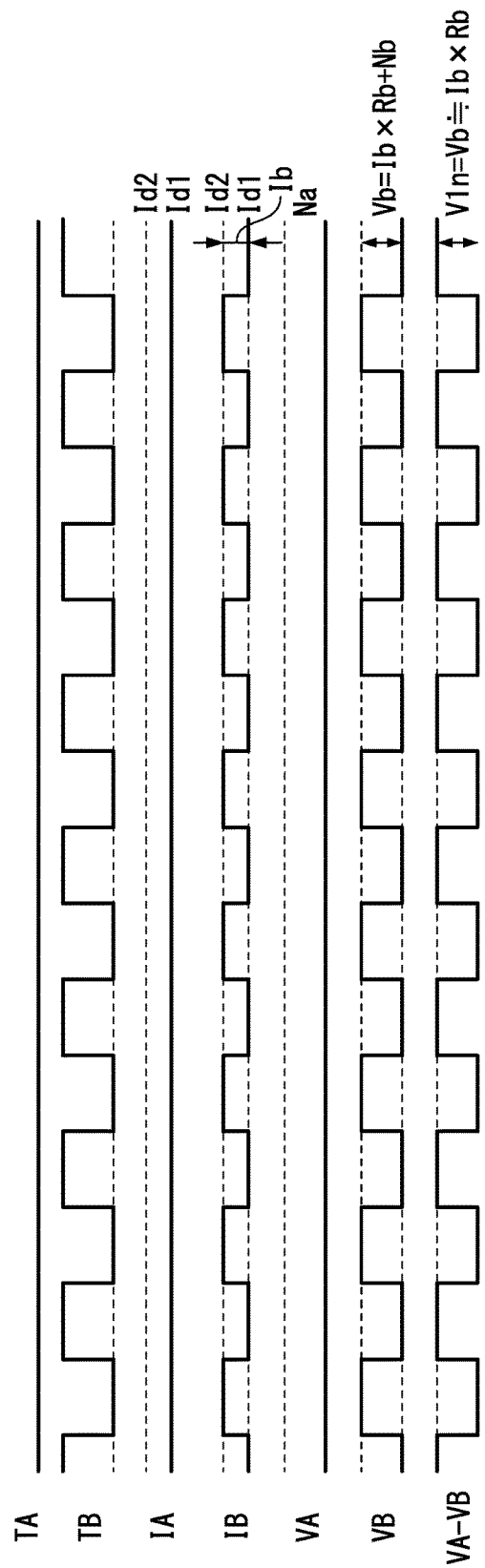

Next, the electrode diagnosis operation for separately diagnosing an abnormality in the detection electrode 1A and the detection electrode 1B in the electromagnetic flow meter 100 will be described. FIGS. 3A and 3B are timing charts illustrating an example of a timing of the respective signals for diagnosing an abnormality of one (detection electrode 1A or detection electrode 1B) of the detection electrodes in the electromagnetic flow meter 100 according to the first embodiment. In FIGS. 3A and 3B, timings and signal levels of respective signals when an abnormality of the detection electrode 1A or detection electrode 1B is diagnosed in the operation of diagnosis for one of the electrodes are illustrated in connection with the signals output by the frequency division circuit 61, the AC signal generation circuit 10A, the AC signal generation circuit 10B, the detection electrode 1A, the detection electrode 1B, and the differential amplification circuit 3, similar to the timing chart illustrated in FIG. 2. FIG. 3A illustrates timings and signal levels of the respective signals when an abnormality of the detection electrode 1A is diagnosed in the operation of diagnosing one of the electrodes, and FIG. 3B illustrates timings and signal levels of the respective signals when an abnormality of the detection electrode 1B is diagnosed in the operation of diagnosing one of the electrodes.

In each of FIGS. 3A and 3B, timings of the AC current timing signal TA, the AC current timing signal TB, the AC signal IA, the AC signal IB, the flow rate signal VA, the flow rate signal VB, and the differential flow rate signal VA−VB are illustrated, similar to the timing chart illustrated in FIG. 2, and signal levels (current values or voltage values) of the respective signals are schematically illustrated by heights thereof In the electromagnetic flow meter 100, the diagnosis of one of the electrodes can be performed when the normal measurement operation is performed. Therefore, even when the diagnosis of one of the electrodes in the electromagnetic flow meter 100 is performed when liquid flows in the measurement pipe 1P, the electromotive force (voltage value) generated due to the liquid flowing in the measurement pipe 1P is simultaneously detected in both the detection electrode 1A and the detection electrode 1B and included in the flow rate signal output by each of the detection electrode 1A and the detection electrode 1B. However, in the following description, for ease of description, it is assumed that the electromotive force (voltage value) due to the flow of the liquid is not included in the flow rate signal output by each of the detection electrode 1A and the detection electrode 1B (the liquid is not flowing in the measurement pipe 1P), similar to when the timing chart illustrated in FIG. 2 has been described.

In the operation of diagnosing one of the electrodes in the electromagnetic flow meter 100, the processor 6 controls the frequency division circuit 61 to cause only any one of the AC signal generation circuit 10A and the AC signal generation circuit 10B corresponding to the detection electrode that is a diagnosis target to output the AC signal and cause the AC current to flow between the detection electrode 1A or the detection electrode 1B corresponding thereto and the ground electrode 1E (see FIGS. 3A and 3B). Thus, only the detection electrode that is a diagnosis target that is either of the detection electrode 1A or the detection electrode 1B from which the AC signal is output detects the electromotive force (voltage value) generated due to the liquid resistance of the liquid between the detection electrode and the ground electrode 1E in the magnetic field formed by the excitation coil 1C, and outputs the flow rate signal having a magnitude (voltage value) of the detected electromotive force (see FIGS. 3A and 3B). Since the electromotive force (voltage value) due to the liquid resistance of the liquid between the detection electrode and the ground electrode 1E is not generated from the other of the detection electrode 1A and the detection electrode 1B from which the AC signal is not output (the detection electrode that is not a diagnosis target), the flow rate signal indicating the magnitude of the electromotive force (voltage value) is not output. That is, a flow rate signal at a constant signal level (voltage value) is output (see FIGS. 3A and 3B). The flow rate signal at the constant signal level (voltage value) corresponds to, for example, a component of noise such as commercial noise. In a case in which the electromagnetic flow meter 100 performs diagnoses for one of the electrodes when performing the normal measurement operation, the flow rate signal at a constant signal level (voltage value) is a flow rate signal (component of noise) obtained by detecting the electromotive force (voltage value) generated due to the liquid flowing in the measurement pipe 1P. In an operation of diagnosing one of the electrodes in the electromagnetic flow meter 100, the differential amplification circuit 3 obtains a difference between the flow rate signals output by the detection electrode 1A and the detection electrode 1B and removes the noise of the in-phase component, and then, the flow rate signal A/D conversion circuit 4 performs analog-digital conversion, similar to the electrode diagnosis operation in the electromagnetic flow meter 100 described above. The processor 6 calculates the resistance value of the detection electrode that is a diagnosis target, and diagnoses an abnormality of either of the detection electrode 1A or the detection electrode 1B based on the calculated resistance value.

First, an operation in a case in which an abnormality of the detection electrode 1A is diagnosed in the diagnosis operation for one of the electrodes in the electromagnetic flow meter 100 will be described with reference to the timing of the signals illustrated in FIG. 3A. As described above, in the operation of diagnosing the detection electrode 1A in the electromagnetic flow meter 100, only the AC signal generation circuit 10A outputs the AC signal IA according to the AC current timing signal TA, and causes an AC current of the AC current Ia to flow between the detection electrode 1A and the ground electrode 1E. Accordingly, the detection electrode 1A detects the electromotive force (voltage value) generated due to the liquid resistance RA, and outputs the flow rate signal VA of the detection voltage Va. On the other hand, the detection electrode 1B outputs a flow rate signal VB at a constant signal level (voltage value=0 V), as illustrated in FIG. 3A, without detecting the electromotive force (voltage value) by assuming no liquid resistance RB (0Ω) since no AC current flows between the detection electrode 1A and the ground electrode 1E.

In the following description, it is assumed that the noise Na is included in the flow rate signal VA and the noise Nb is included in the flow rate signal VB. That is, the electromotive force (voltage value) generated due to the liquid resistance RA of the liquid between the detection electrode 1A and the ground electrode 1E in the measurement pipe 1P and the noise Na are included in the flow rate signal VA, and only the noise Nb is included in the flow rate signal VB.

In this case, the detection voltage V1$n$ of the differential flow rate signal VA−VB output by the differential amplification circuit 3 can be expressed as in Equation (11) from Equation (7).

$$V1n=(Ia \times Ra+Na)-(Nb) \qquad (11)$$

The detection voltage V1$n$ of Equation (11) can be expressed using Equation (12).

$$V1n=Ia \times (Ra)+(Na-Nb) \qquad (12)$$

Here, since the noise Na and the noise Nb are noises of the in-phase component, a relationship between the noise Na and the noise Nb can be said to have a relationship of Equation (9). Therefore, a component (voltage value) of the same detection voltage V1 as in Equation (5) above included in Equation (12) above and a noise component (voltage value) can be said to have a relationship such as Equation (13) below.

$$(Na-Nb) \ll Ia \times (Ra) \quad (13)$$

From Equation (13), it can be said that Equation (11) is substantially the same as the case in which the electrode resistance Rb is 0Ω in Equation (5). This indicates that noise of the in-phase component is removed even when an abnormality of the detection electrode 1A is diagnosed by the differential amplification circuit 3 obtaining the difference between the flow rate signal VA output from the detection electrode 1A and the flow rate signal VB output from the detection electrode 1B. That is, the detection voltage V1$n$ can be expressed using Equation (14).

$$V1n \approx Ia \times Ra \quad (14)$$

Thus, the processor 6 applies the same calculation as in Equation (2) above to Equation (14) above to calculate the electrode resistance Ra. The processor 6 diagnoses an abnormality of the detection electrode 1A based on the calculated electrode resistance Ra. The diagnosis of the detection electrode 1A in the electromagnetic flow meter 100 is performed using the same method as in a case in which the abnormality of the detection electrode 1A and the detection electrode 1B is diagnosed in the electromagnetic flow meter 100. More specifically, first, the processor 6 stores the electrode resistance Ra calculated in an installation step such as when the electromagnetic flow meter 100 is installed (mounted) in a facility in the memory 8. The processor 6 diagnoses an abnormality of the detection electrode 1A based on the electrode resistance Ra calculated in the operation step such as when the electromagnetic flow meter 100 is installed and operated, that is, the electrode resistance Ra (hereinafter referred to as "electrode resistance Ran") calculated in the electrode diagnosis that has been performed at this time, and the electrode resistance Ra stored in the memory 8. The processor 6 outputs a diagnosis result signal (measurement signal) indicating a diagnosis result to the outside of the electromagnetic flow meter 100.

Thus, in the electromagnetic flow meter 100, when an abnormality of the detection electrode 1A is diagnosed, the AC signal can be output by the AC signal generation circuit 10A corresponding to the detection electrode 1A, and the abnormality of the detection electrode 1A can be diagnosed after the noise of the in-phase component is removed based on the flow rate signals output from the detection electrode 1A and the detection electrode 1B.

Subsequently, an operation in a case in which an abnormality of the detection electrode 1B is diagnosed in an operation of diagnosing one electrode in the electromagnetic flow meter 100 will be described with reference to timings of the signals illustrated in FIG. 3B. The operation of diagnosing the detection electrode 1B in the electromagnetic flow meter 100 can be similarly considered by replacing the detection electrode 1A in the operation of diagnosing the detection electrode 1A as described above with the detection electrode 1B. In other words, in the operation of diagnosing the detection electrode 1B in the electromagnetic flow meter 100, only the AC signal generation circuit 10B outputs the AC signal IB according to the AC current timing signal TB, and causes an AC current of the AC current Ib to flow between the detection electrode 1B and the ground electrode 1E, and calculates the detection voltage V1$n$ based on the flow rate signal VB of the detection voltage Vb that the detection electrode 1B outputs by detecting the electromotive force (voltage value) generated due to the liquid resistance RB. The detection voltage V1$n$ in the operation of diagnosing the detection electrode 1B in the electromagnetic flow meter 100 can be expressed using Equation (15).

$$V1n \approx Ib \times Rb \quad (15)$$

Thus, the processor 6 applies the same calculation as in Equation (2) above to Equation (15) above to calculate the electrode resistance Rb, and diagnoses an abnormality of the detection electrode 1B based on the calculated electrode resistance Rb. The diagnosis of the detection electrode 1B in the electromagnetic flow meter 100 is similar to the diagnosis of the detection electrode 1A, and the processor 6 diagnoses an abnormality of the detection electrode 1B based on the electrode resistance Rb (hereinafter referred to as "electrode resistance Rbn") calculated in the operation step such as when the electromagnetic flow meter 100 is installed and operated, and the electrode resistance Rb stored in the memory 8, which is calculated in an installation step such as when the electromagnetic flow meter 100 is installed (mounted) in a facility. The processor 6 outputs a diagnosis result signal (measurement signal) indicating a diagnosis result to the outside of the electromagnetic flow meter 100.

Thus, in the electromagnetic flow meter 100, when an abnormality of the detection electrode 1B is diagnosed, the AC signal can be output by the AC signal generation circuit 10B corresponding to the detection electrode 1B, and the abnormality of the detection electrode 1B can be diagnosed after the noise of the in-phase component is removed based on the flow rate signals output from the detection electrode 1A and the detection electrode 1B.

Thus, in the electromagnetic flow meter 100, even when an abnormality in one of the detection electrodes is diagnosed, any one of the AC signal generation circuit 10A and the AC signal generation circuit 10B corresponding to the detection electrode that is a diagnosis target outputs the AC signal, and noise of an in-phase component is removed based on the flow rate signals output from the detection electrode 1A and the detection electrode 1B to thereby diagnose the abnormality of the detection electrode that is a diagnosis target. A result of the diagnosis is a result of the differential amplification circuit 3 diagnosing based on the differential flow rate signal from which the noise of the in-phase component has been removed by obtaining the difference between the respective flow rate signals output from the detection electrode 1A and the detection electrode 1B, and is a result of diagnosing the abnormality of the detection electrode that is a diagnosis target more accurately.

In a case in which an abnormality of one of the detection electrodes is diagnosed in the electromagnetic flow meter 100, it may be first diagnosed whether there is an abnormality in one of the detection electrodes may be first diagnosed, and if this detection electrode is diagnosed to be normal the abnormality of the other detection electrode may be diagnosed. For example, if at least one of the detection electrode 1A and the detection electrode 1B is diagnosed to be abnormal in the electrode diagnosis operation using a comparison of the electrode resistance R1 with the electrode resistance R1$n$, the diagnosis of an abnormality may be first performed on the detection electrode 1A, and if the detection electrode 1A is diagnosed to be normal, the diagnosis of an abnormality may be performed on the detection electrode 1B.

As described above, in the electromagnetic flow meter 100, the AC signal generation circuit 10A corresponding to the detection electrode 1A and the AC signal generation circuit 10B corresponding to the detection electrode 1B are included, and each of the AC signal generation circuit 10A and the AC signal generation circuit 10B outputs the AC signal to cause each AC current to flow between the detection electrode 1A or the detection electrode 1B corresponding thereto and the ground electrode 1E. In the electromagnetic flow meter 100, the electrode resistance R1 that is the resistance value of the liquid between the detection electrode 1A and the detection electrode 1B is calculated based on the flow rate signal output from each of the detection electrode 1A and the detection electrode 1B, and an abnormality of at least one of the detection electrode 1A and the detection electrode 1B is diagnosed based on the calculated electrode resistance R1. In this case, in the electromagnetic flow meter 100, the differential amplification circuit 3 obtains the difference between the respective flow rate signals output from the detection electrode 1A and the detection electrode 1B to calculate the electrode resistance R1 based on the differential flow rate signal VA–VB after noise of an in-phase component has been removed, similar to the normal measurement operation. Thus, in the electromagnetic flow meter 100, it is possible to diagnose an abnormality of at least either of the detection electrode 1A or the detection electrode 1B more accurately than in the electromagnetic flow meter of the related art.

Further, if at least either of the detection electrode 1A or the detection electrode 1B is diagnosed to be abnormal, the electromagnetic flow meter 100 controls the output of the AC signal of the AC signal generation circuit 10A and the AC signal generation circuit 10B and calculates the electrode resistance Ra that is a resistance value of the liquid between the detection electrode 1A and the ground electrode 1E or the electrode resistance Rb that is a resistance value of the liquid between the detection electrode 1B and the ground electrode 1E based on the flow rate signal output from each of the detection electrode 1A and the detection electrode 1B. Thus, in the electromagnetic flow meter 100, when at least one of the detection electrode 1A and the detection electrode 1B is diagnosed to be abnormal, it is possible to separate the detection electrode 1A and the detection electrode 1B and individually diagnose an abnormal detection electrode, that is, to specify the abnormal detection electrode. Further, in the electromagnetic flow meter 100, even when abnormalities of the detection electrode 1A and the detection electrode 1B are separately individually diagnosed, the electrode resistance Ra or the electrode resistance Rb is calculated based on the differential flow rate signal VA–VB after the noise of the in-phase component is removed by the differential amplification circuit 3, similar to the normal measurement operation. Thus, in the electromagnetic flow meter 100, even when the abnormalities of the detection electrode 1A and the detection electrode 1B are individually diagnosed, it is possible to diagnose (specify) whether both of the detection electrode 1A and the detection electrode 1B is abnormal or either of the detection electrode 1A or the detection electrode 1B is abnormal, more accurately than in an electromagnetic flow meter of the related art.

In the diagnosis of the abnormality of the detection electrode in the electromagnetic flow meter 100, the electrode resistance R1, the electrode resistance Ra, and the electrode resistance Rb calculated in the installation step such as when the electromagnetic flow meter 100 is installed (mounted) in a facility are stored in the memory 8, and compared with the electrode resistance R1$n$, the electrode resistance Ra$n$, and the electrode resistance Rb$n$ calculated in the electrode diagnosis that has been performed at this time, to thereby diagnose an abnormality of the respective detection electrodes. Here, if the electrode resistance R1, the electrode resistance Ra, and the electrode resistance Rb are referred to as an "electrode resistance R" without being distinguished and the electrode resistance R1$n$, the electrode resistance Ra$n$, and the electrode resistance Rb$n$ are referred to as "electrode resistance R$n$" without being distinguished, the electrode resistance R$n$ calculated in the electrode diagnosis that has been performed at this time is compared with the electrode resistance R stored in the memory 8 to thereby diagnose an abnormality of the respective detection electrodes in the diagnosis of the abnormality of the detection electrode in the electromagnetic flow meter 100. That is, in the electromagnetic flow meter 100, the abnormality of the respective detection electrodes is diagnosed using the fact that the electrode resistance R is substantially the same as the electrode resistance R$n$ when the respective detection electrodes are normal. In the following description, the electrode resistance R1, the electrode resistance Ra, and the electrode resistance Rb are referred to as an "electrode resistance R" without being distinguished and the electrode resistance R1$n$, the electrode resistance Ra$n$, and the electrode resistance Rb$n$ are referred to as "electrode resistance R$n$" without being distinguished.

As described above, it is possible to perform the diagnosis of the abnormality of the respective detection electrodes without the AC signals output by the AC signal generation circuit 10A and the AC signal generation circuit 10B in order to diagnose the abnormality of the detection electrodes in the electromagnetic flow meter 100 affecting the measurement of the fluid velocity of the liquid in the normal measurement operation of the electromagnetic flow meter 100. Therefore, in the electromagnetic flow meter 100, the signal level of the AC signal (current value) output by each of the AC signal generation circuit 10A and the AC signal generation circuit 10B may be lowered to a signal level (current value) at which the calculation of the electrode resistance R and the electrode resistance R$n$ is sufficiently performed, and the diagnosis of the detection electrode (for example, at least either of the detection electrode 1A or the detection electrode 1B, only the detection electrode 1A, or only the detection electrode 1B) may be regularly performed at the same time as the normal measurement operation. In this case, the electromagnetic flow meter 100 may be configured to store (update) the electrode resistance R$n$ calculated in the diagnosis of the abnormality that has been regularly performed, in the memory 8 as the electrode resistance R that is a new criterion in place of the electrode resistance R stored in the memory 8. Further, the electromagnetic flow meter 100 may be configured to store the electrode resistance R$n$ calculated in regular diagnosis of the abnormality of the detection electrode in the memory 8 a plurality of times and use each electrode resistance R$n$ as information for diagnosing the progress of the abnormality of the detection electrode.

In the above description, the electrode diagnosis method of diagnosing an abnormality by comparing the electrode resistance R calculated in the installation step such as when the electromagnetic flow meter 100 is installed (mounted) in a facility with the electrode resistance R$n$ calculated in the operation step such as when the electromagnetic flow meter 100 is installed and operated has been described. More specifically, the method of determining (diagnosing) whether the detection electrode is normal or abnormal based on whether the difference between the electrode resistance R and the electrode resistance R$n$ is within a threshold value of the resistance value has been described. However, the method of diagnosing an abnormality of the detection electrode in the electromagnetic flow meter 100 is not limited to the diagnosis method using the comparison of the electrode resistance R with the electrode resistance Rn. For example, in the electromagnetic flow meter 100, it may be determined (diagnosed) whether the detection electrode is normal or abnormal by setting the conditions with which the abnormality of the detection electrode can be diagnosed (determined) from the electrode resistance R and the electrode resistance Rn as the determination conditions in advance and applying the predetermined determination conditions to the electrode resistance R and the electrode resistance Rn.

Here, an example of a diagnosis method of diagnosing an abnormality of the detection electrodes based on predetermined determination conditions in the electromagnetic flow meter 100 will be described. As causes of an abnormality for which an abnormality in the detection electrode can be diagnosed (determined) from the electrode resistance R and the electrode resistance Rn, such as a large change in the electrode resistance Rn, a variety of states such as insulation deterioration of detection electrodes, corrosion of the detection electrodes, and adhesion of foreign matter to the detection electrodes can be conceived. In the following description, determination conditions in a case in which a state of the insulation deterioration of the detection electrodes is diagnosed (determined) to be abnormal will be described.

In general, when the insulation deterioration of the detection electrode occurs, the resistance value of the detection electrode decreases. Therefore, in the electromagnetic flow meter 100, for example, the following determination conditions are set as determination conditions with which the insulation deterioration of the detection electrode can be diagnosed using this fact.

(Determination condition 1): When Equation (16) below is satisfied, it is determined that insulation deterioration has occurred in at least either of the detection electrode 1A or the detection electrode 1B.

$$R1n - R1 \ll 0 \qquad (16)$$

(Determination condition 2): If Equations (17) and (18) below are satisfied, it is determined that insulation deterioration has occurred in the detection electrode 1B. If determination condition 2 is satisfied, it can be determined that no insulation deterioration has occurred in the detection electrode 1A, that is, the detection electrode 1A is normal.

$$Ran - Ra \approx 0 \qquad (17)$$

$$Rbn - Rb \ll 0 \qquad (18)$$

(Determination condition 3): If Equation (19) and Equation (20) are satisfied, insulation deterioration is determined to have occurred in the detection electrode 1A. If this determination condition 3 is satisfied, it can be determined that no insulation deterioration has occurred in the detection electrode 1B, that is, the detection electrode 1B is normal.

$$Ran - Ra \ll 0 \qquad (19)$$

$$Rbn - Rb \approx 0 \qquad (20)$$

A value of a right side of each of Equation (16) above of determination condition 1, Equation (18) above of determination condition 2, and Equation (19) above of determination condition 3 may be a threshold value resistance value for determining that insulation deterioration has occurred. Further, a value of a right side in each of Equation (17) above of determination condition 2 and Equation (20) above of determination condition 3 may be values or percentages (%) indicating a range in which a difference between the electrode resistance R and the electrode resistance Rn can be allowed.

By sequentially performing the determination according to the conditions including determination condition 1 to determination condition 3 described above, it is possible to diagnose the insulation deterioration of the detection electrode in the electromagnetic flow meter 100. Although the above-described determination conditions are conditions for diagnosing the insulation deterioration of the detection electrode based on the electrode resistance R and the electrode resistance Rn, it is possible to diagnose the insulation deterioration of the detection electrode in the electromagnetic flow meter 100 even when the electrode resistance R cannot be included in the determination condition, for example, for a reason that the electrode resistance R is not stored in the memory 8 in the installation step such as when the electromagnetic flow meter 100 is installed (mounted) in a facility. That is, in the electromagnetic flow meter 100, it is possible to diagnose the insulation deterioration of the detection electrodes through a combination of the electrode resistance R1$n$, the electrode resistance Ran, and the electrode resistance Rbn using only the electrode resistance Rn calculated in the operation step such as when the electromagnetic flow meter 100 is installed and operated. In this case, in the electromagnetic flow meter 100, for example, the following determination condition is set as a determination condition for diagnosing the insulation deterioration of the detection electrode using only the electrode resistance Rn.

(Determination condition 4): If any of Equations (21) to (23) is satisfied, insulation deterioration is determined to have occurred in the detection electrode 1A.

$$R1n/2 \gg Ran \qquad (21)$$

$$R1n - Rbn \approx 0 \qquad (22)$$

$$Ran - Rbn \ll 0 \qquad (23)$$

(Determination condition 5): if any of Equations (24) to (26) is satisfied, insulation deterioration is determined to have occurred in the detection electrode 1B.

$$R1n/2 \gg Rbn \qquad (24)$$

$$R1n - Ran \approx 0 \qquad (25)$$

$$Ran - Rbn \gg 0 \qquad (26)$$

By sequentially performing the determination using the determination conditions including determination conditions 4 and 5 described above, it is possible to diagnose the insulation deterioration of the detection electrode in the electromagnetic flow meter 100. The determination conditions including determination condition 4 and determination condition 5 described above are conditions for diagnosing insulation deterioration of the detection electrodes based on the fact that the electrode resistance Ran and the electrode resistance Rbn are assumed to be substantially equal if each of the detection electrode 1A and the detection electrode 1B is not abnormal (is normal) from the fact that the ground electrode 1E in the electromagnetic flow meter 100 is disposed in a position in which a distance between the ground electrode 1E and the detection electrode 1A and a distance between the ground electrode 1E and the detection electrode 1B becomes equal. That is, the electrode resistance Ran and the electrode resistance Rbn are diagnosis conditions in a case in which the electrode resistance Ran and the electrode resistance Rbn are assumed to be resistance values of half the electrode resistance R1$n$.

In each of the equations in determination condition 4 and determination condition 5, the value of the right side may be a threshold value of the resistance value for determining that the insulation deterioration has occurred or values or a percentage (%) indicating a range of the difference that can be allowed. However, in this case, Equation (21) above of determination condition 4 is changed into, for example, Equation (27) below, and Equation (24) above of determination condition 5 is changed into, for example, Equation (28) below.

$$R1n/2 - Ran \gg 0 \tag{27}$$

$$R1n/2 - Rbn \gg 0 \tag{28}$$

Although the determination conditions when the insulation deterioration is a cause of the abnormality of the detection electrodes have been described in the description of the above-described determination conditions, it is possible to perform diagnosis (determination) of abnormalities caused by various states by setting conditions for diagnosing (determining) an abnormality caused by various other states such as corrosion of the detection electrode or adhesion of foreign matter to the detection electrode and conditions for diagnosing (determining) the above-described insulation deterioration as a cause of an abnormality of the detection electrodes based on the same concept. That is, if a cause of an abnormality can be diagnosed (specified) using the electrode resistance R and the electrode resistance Rn or the electrode resistance Rn, it is possible to diagnose (determine) a variety of abnormalities of the detection electrodes by setting the conditions according to the cause of the abnormality.

As described above, the electromagnetic flow meter 100 of the first embodiment includes the AC signal generation circuit 10A corresponding to the detection electrode 1A, and the AC signal generation circuit 10B corresponding to the detection electrode 1B. In the electromagnetic flow meter 100 of the first embodiment, the AC current having a predetermined current value is caused to flow between the detection electrode 1A and the ground electrode 1E by the AC signal generation circuit 10A, and the AC current having a predetermined current value is caused to flow between the detection electrodes 1B and the ground electrode 1E by the AC signal generation circuit 10B. In the electromagnetic flow meter 100 of the first embodiment, the electrode resistance R1 that is the resistance value of the liquid between the detection electrode 1A and the detection electrode 1B is calculated based on the respective flow rate signals detected and output by the detection electrode 1A and the detection electrode 1B due to the flow of the AC current. In the electromagnetic flow meter 100 of the first embodiment, the electrode resistance R1 calculated in the installation step is stored in the memory 8, and the abnormality of at least either of the detection electrode 1A or the detection electrode 1B is diagnosed based on the stored electrode resistance R1 and the electrode resistance R1 calculated in the operation step. In this case, the electrode resistance R1 calculated in each step by the electromagnetic flow meter 100 of the first embodiment is the electrode resistance R1 calculated based on the differential flow rate signal VA–VB after the noise of the in-phase component is removed by obtaining the difference between the respective flow rate signals output from the detection electrode 1A and the detection electrode 1B in the differential amplification circuit 3, similar to the normal measurement operation. Therefore, in the electromagnetic flow meter 100 of the first embodiment, it is possible to diagnose the abnormality of at least either of the detection electrode 1A or the detection electrode 1B more accurately than in the electromagnetic flow meter of the related art.

Further, in the electromagnetic flow meter 100 of the first embodiment, if at least either of the detection electrode 1A or the detection electrode 1B is diagnosed to be abnormal, the AC signal generation circuit 10A and the AC signal generation circuit 10B are controlled such that they cause the AC current having a predetermined current value to flow in either one of between the detection electrode 1A and the ground electrode 1E or between the detection electrode 1B and the ground electrode 1E. In the electromagnetic flow meter 100 of the first embodiment, the electrode resistance R that is the resistance value of the liquid between the detection electrodes in which the AC current is caused to flow and the ground electrode 1E is calculated based on the respective flow rate signals detected and output by the detection electrode 1A and the detection electrode 1B in a state in which the AC current is caused to flow in any one of the detection electrodes. That is, in the electromagnetic flow meter 100 of the first embodiment, the electrode resistance Ra that is the resistance value of the liquid between the detection electrode 1A and the ground electrode 1E or the electrode resistance Rb that is the resistance value of the liquid between the detection electrode 1B and the ground electrode 1E is calculated individually by switching the detection electrode in which the AC current is caused to flow. In the electromagnetic flow meter 100 of the first embodiment, the electrode resistance R calculated in the installation step is stored in the memory 8, and the abnormality in the detection electrode 1A and the detection electrode 1B is individually diagnosed based on the stored electrode resistance R and the electrode resistance R individually calculated in the operation step. That is, in the electromagnetic flow meter 100 of the first embodiment, it is possible to specify an abnormal detection electrode by separately diagnosing the abnormality in the detection electrode 1A and the detection electrode 1B. Further, in the electromagnetic flow meter 100 of the first embodiment, even when the electrode resistances R of the detection electrode 1A and the detection electrode 1B are individually calculated, the electrode resistance R calculated in each step is the electrode resistance R calculated based on the differential flow rate signal VA–VB after the noise of the in-phase component is removed by obtaining the difference between the respective flow rate signals output from the detection electrode 1A and the detection electrode 1B in the differential amplification circuit 3, similar to the normal measurement operation. Therefore, in the electromagnetic flow meter 100 of the first embodiment, even when the electrode resistances R of the detection electrode 1A and the detection electrode 1B are individually calculated, it is possible to calculate the individual electrode resistance R more accurately than in a case in which the electrode resistance R is calculated in a state in which the noise is included as in the electromagnetic flow meter of the related art. Thus, in the electromagnetic flow meter 100 of the first embodiment, it is possible to diagnose individual abnormalities of the detection electrode 1A and the detection electrode 1B with more accuracy and to diagnose the abnormality of the detection electrode 1A or the detection electrode 1B and specify the abnormal detection electrode more accurately than in the electromagnetic flow meter of the related art.

In the electromagnetic flow meter 100 of the first embodiment, the configuration in which the frequency division circuit 61 included in the processor 6 divides the clock signal input from the clock circuit 7 to generate the timing signals (the excitation current timing signal TEX, the AC current timing signal TA, and the AC current timing signal TB) at frequencies necessary for respective operations of the excitation circuit 5, the AC signal generation circuit 10A, and the AC signal generation circuit 10B has been illustrated. However, the configuration in which the respective timing signals are generated in the electromagnetic flow meter 100 is not limited to the configuration illustrated in FIG. 1. For example, a configuration in which respective timing signals are generated by a counter circuit or a timer circuit included in the processor 6 may be adopted. In this configuration, the same timing signals as the respective timing signals generated by the frequency division circuit 61 can be generated due to the counter circuit and the timer circuit operating based on a timing of the clock signal input from the clock circuit 7.

Further, in the electromagnetic flow meter 100 of the first embodiment, the configuration in which the AC signal generation circuit 10A corresponding to the detection electrode 1A and the AC signal generation circuit 10B corresponding to the detection electrode 1B are included, the AC signal generation circuit 10A outputs the AC signal IA and causes the AC current Ia to flow between the detection electrode 1A and the ground electrode 1E, and the AC signal generation circuit 10B outputs the AC signal IB and causes the AC current Ib to flow between the detection electrode 1B and the ground electrode 1E has been illustrated. However, the configuration in which the AC signals (AC current) corresponding to the detection electrode 1A and the detection electrode 1B in the electromagnetic flow meter 100 are output is not limited to the configuration illustrated in FIG. 1 and may be a configuration in which the AC signals (AC current) corresponding to the detection electrode 1A and the detection electrode 1B are generated and output by on circuit. For example, the configuration may be a configuration in which one synchronous rectification circuit is included as an AC signal generation circuit in the electromagnetic flow meter 100, an AC signal (AC current) having a predetermined current value at a frequency of the AC current timing signal TA is generated and output between the detection electrode 1A and the ground electrode 1E, and an AC signal (AC current) obtained by inverting the generated AC signal (AC current) is further generated and output between the detection electrode 1B and the ground electrode 1E. Further, for example, the configuration may be a configuration in which one switching circuit is included as the AC signal generation circuit in the electromagnetic flow meter 100 and a switching operation according to the AC current timing signal TA is performed, such that an AC signal (AC current) having a predetermined current value at a frequency of the AC current timing signal TA and an inverted AC signal (AC current) are generated and the generated inverted AC signal (AC current) is output between the detection electrode 1A or the detection electrode 1B and the ground electrode 1E.

Further, the AC current timing signal TA and the AC current timing signal TB have been described as the AC current timing signals with opposite phases in the electromagnetic flow meter 100 of the first embodiment. However, for example, the AC current timing signal TA and the AC current timing signal TB may not be AC current timing signals with opposite phases by enabling a function of any one of the AC signal generation circuit 10A and the AC signal generation circuit 10B in a case in which the AC signal generation circuit 10A and the AC signal generation circuit 10B have a function of inverting the input AC current timing signal and operating according to the inverted AC current timing signal. That is, in this case, the AC current timing signal TA and the AC current timing signal TB may be the same AC current timing signal.

Thus, in the electromagnetic flow meter 100 of the first embodiment, a configuration in which the frequency division circuit 61 generates and outputs one AC current timing signal (for example, the AC current timing signal TA), and one AC signal generation circuit (for example, the AC signal generation circuit 10A) generates and outputs the AC signal IA for causing the AC current Ia to flow between the detection electrode 1A and the ground electrode 1E and the AC signal 1B for causing the AC current Ib to flow between the detection electrode 1B and the ground electrode 1E based on the one AC current timing signal may be adopted.

Further, in the electromagnetic flow meter 100 of the first embodiment, the configuration in which a digital signal indicating a result of performing the calculation process in the processor 6 (the fluid velocity of the liquid flowing in the measurement pipe 1P or a result of diagnosing an abnormality of at least either of the detection electrode 1A or the detection electrode 1B) is output to the output circuit 9, and the output circuit 9 outputs the result to the outside of the electromagnetic flow meter 100 as the measurement signal obtained through the measurement in the electromagnetic flow meter 100 has been shown. However, the configuration for outputting the fluid velocity of the liquid flowing in the measurement pipe 1P or the result of diagnosing an abnormality of at least either of the detection electrode 1A or the detection electrode 1B in the electromagnetic flow meter 100 is not limited to the configuration illustrated in FIG. 1. For example, a configuration in which the fluid velocity or the result of diagnosing the abnormality of the respective detection electrodes (for example, a result of diagnosing both of the respective detection electrodes or a result of diagnosing each of the detection electrodes) is displayed on a display unit included in the electromagnetic flow meter 100 may be adopted.

In the electromagnetic flow meter 100 of the first embodiment, an operation in a case in which the abnormal detection electrode is specified by separately diagnosing the abnormality in the detection electrode 1A and the detection electrode 1B when at least one of the detection electrode 1A and the detection electrode 1B is diagnosed to be abnormal has been shown. However, the operation for specifying the abnormal detection electrode is not limited to being performed when at least either of the detection electrode 1A or the detection electrode 1B is diagnosed to be abnormal. For example, in a first step of the electrode diagnosis operation in the electromagnetic flow meter 100, that is, the step in which the abnormality of the detection electrode 1A or the detection electrode 1B is not diagnosed, an abnormality may be separately diagnosed in the detection electrode 1A and the detection electrode 1B.

Further, in the electromagnetic flow meter 100 of the first embodiment, the configuration of the electromagnetic flow meter that includes two detection electrodes including the detection electrode 1A and the detection electrode 1B is shown. However, the number of detection electrodes included in the electromagnetic flow meter 100 is not limited to the number illustrated in FIG. 1. For example, the electromagnetic flow meter may have more detection electrodes than in the electromagnetic flow meter 100 of the first embodiment illustrated in FIG. 1, such as four or more detection electrodes. A concept of diagnosing an abnormality of each of the detection electrodes in the electromagnetic flow meter 100 can be similarly applied to the configuration of the electromagnetic flow meter having more detection electrodes than in the electromagnetic flow meter 100 of the first embodiment illustrated in FIG. 1.

Second Embodiment

Figure 4:
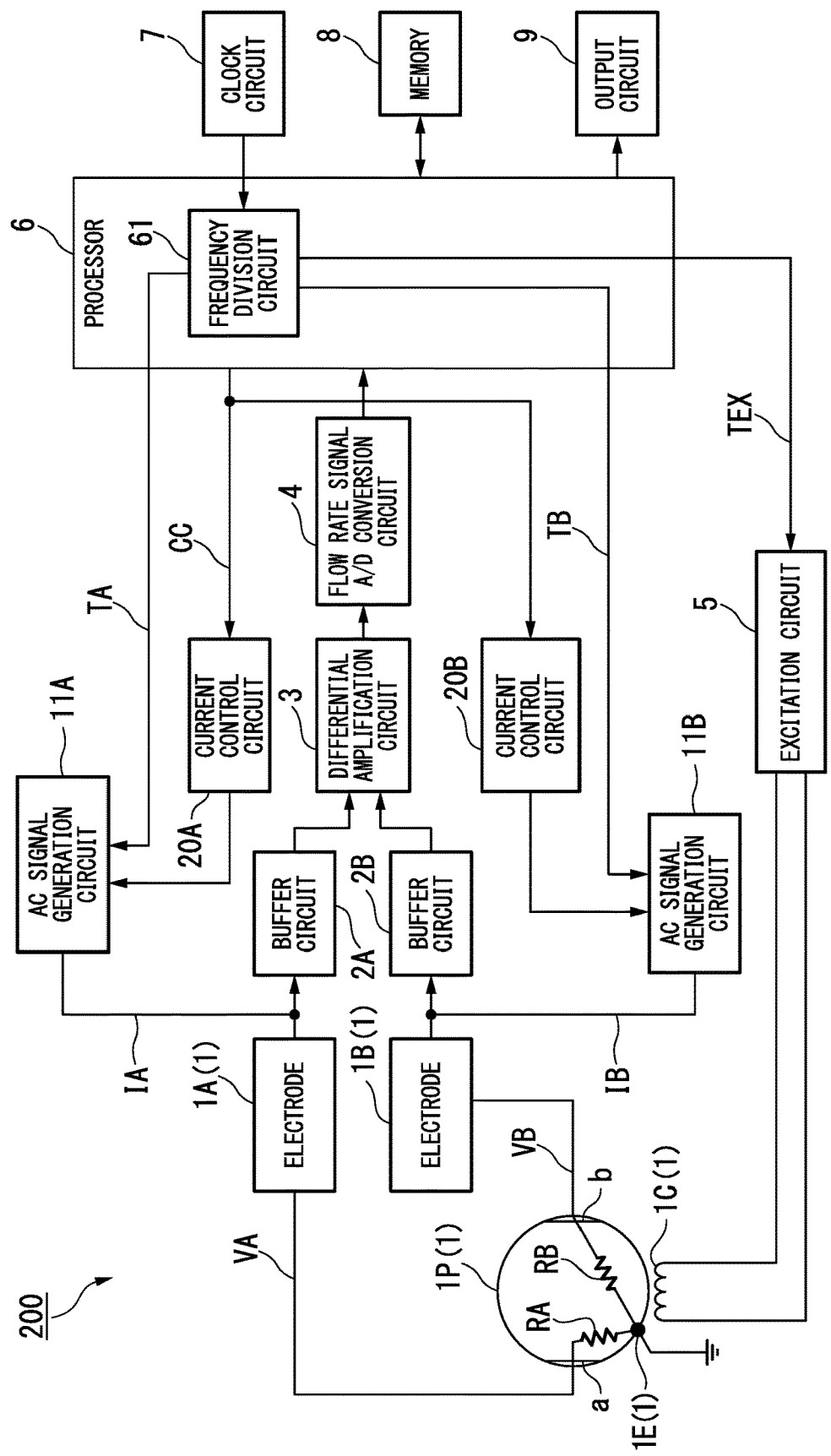
FIG. 4 is a block diagram illustrating a schematic configuration of an electromagnetic flow meter according to a second embodiment of the present invention.

Next, a second embodiment of the present invention will be described. FIG. 4 is a block diagram illustrating a schematic configuration of an electromagnetic flow meter according to a second embodiment of the present invention. An electromagnetic flow meter 200 includes a sensor 1, a buffer circuit 2A, a buffer circuit 2B, a differential amplification circuit 3, a flow rate signal A/D conversion circuit 4, an excitation circuit 5, a processor 6, a clock circuit 7, a memory 8, an output circuit 9, an AC signal generation circuit 11A, an AC signal generation circuit 11B, a current control circuit 20A, and a current control circuit 20B.

The electromagnetic flow meter 200 illustrated in FIG. 4 is configured to further include a current control circuit 20A and a current control circuit 20B, in addition to the electromagnetic flow meter 100 of the first embodiment illustrated in FIG. 1. With the addition of the current control circuit 20A and the current control circuit 20B, in the electromagnetic flow meter 200, the AC signal generation circuit 11A is used in place of the AC signal generation circuit 10A included in the electromagnetic flow meter 100 of the first embodiment, and the AC signal generation circuit 11B is used in place of the AC signal generation circuit 10B. Other components included in the electromagnetic flow meter 200 are the same components as the corresponding components included in the electromagnetic flow meter 100 of the first embodiment illustrated in FIG. 1. Therefore, in the following description, in components of the electromagnetic flow meter 200, the same components as those included in the electromagnetic flow meter 100 are denoted with the same reference signs, detailed description of the respective components will be omitted, and only components and operation in the electromagnetic flow meter 200 different from those in the electromagnetic flow meter 100 will be described.

The electromagnetic flow meter 200 is a field device that is installed in a facility such as pipe disposed in a plant and measures velocity (fluid velocity) of conductive liquid which is fluid that is a measurement target flowing in the measurement pipe 1P, similar to the electromagnetic flow meter 100 of the first embodiment. That is, the electromagnetic flow meter 200 calculates a fluid velocity of the liquid flowing in the measurement pipe 1P based on a flow rate signal (voltage signal) measured by the sensor 1, and outputs a measurement signal indicating the calculated fluid velocity, similar to the electromagnetic flow meter 100.

In the electromagnetic flow meter 200, for ease of description, each of the detection electrode 1A disposed in a position a and the detection electrode 1B disposed in a position b is extracted and shown in a position adjacent to the corresponding buffer circuit 2A or buffer circuit 2B, similar to the electromagnetic flow meter 100 illustrated in FIG. 1.

The processor 6 is a control unit that operates based on the clock signal output from the clock circuit 7 and controls the respective components included in the electromagnetic flow meter 200. The processor 6 performs a predetermined calculation process of calculating a fluid velocity in a normal measurement operation of the electromagnetic flow meter 200, and a calculation process of diagnosing an abnormality of at least either of the detection electrode 1A or the detection electrode 1B in an electrode diagnosis operation in the electromagnetic flow meter 200 according to an executed application program. Further, the processor 6 outputs respective timing signals (an excitation current timing signal TEX, an AC current timing signal TA, and an AC current timing signal TB) generated by the frequency division circuit 61 to the excitation circuit 5, the AC signal generation circuit 11A, and the AC signal generation circuit 11B, respectively. Further, the processor 6 in the electromagnetic flow meter 200 controls a current value of an AC signal (AC current) output by the AC signal generation circuit 11A and the AC signal generation circuit 11B using the current control circuit 20A and the current control circuit 20B when an electrode diagnosis operation is performed in the electromagnetic flow meter 200. Therefore, the processor 6 outputs current control signals CC indicating current values of AC signals (AC currents) output by the AC signal generation circuit 11A and the AC signal generation circuit 11B to the current control circuit 20A and the current control circuit 20B, respectively. More specifically, the processor 6 determines signal levels (current values) of the AC signal IA and the AC signal IB output by the AC signal generation circuit 11A and the AC signal generation circuit 11B so that electromotive forces (voltage values) generated due to the liquid resistance RA and the liquid resistance RB, which are included in the flow rate signals output by the detection electrode 1A and the detection electrode 1B, have signal levels (current values) at which calculation of the electrode resistance R can be sufficiently performed, based on a magnitude of the calculated electrode resistance R.

For example, when the signal level (voltage value) of the flow rate signal output by each of the detection electrode 1A and the detection electrode 1B is low, the processor 6 determines the signal level (current value) of the AC signal IA and the AC signal IB output by the AC signal generation circuit 11A and the AC signal generation circuit 11B to be a high current value so that each of the electrode resistance R1, the electrode resistance Ra, and the electrode resistance Rb can be accurately calculated. Thus, for example, if the abnormality of the detection electrode is caused by insulation deterioration or if a conductivity of the liquid that is a measurement target is high, even when the resistance value decreases according to the progress of the deterioration, it is possible to increase the signal level (voltage value) of the flow rate signal output by each of the detection electrode 1A and the detection electrode 1B by increasing the signal level (current value) of the AC signal IA and the AC signal IB. Thus, it is possible to prevent the electromotive force (voltage value) to be inherently detected from being hidden (buried) by noise (voltage value) such as commercial noise. In other words, it is possible to increase a signal/noise (S/N) ratio in the flow rate signal output by each of the detection electrode 1A and the detection electrode 1B.

Further, for example, if the signal level (voltage value) of the flow rate signal output by each of the detection electrode 1A and the detection electrode 1B is unnecessarily high, the signal levels (current values) of the AC signal IA and the AC signal IB output by the AC signal generation circuit 11A and the AC signal generation circuit 11B are determined to be low current values up to a level at which the electrode resistance R1, the electrode resistance Ra, and the electrode resistance Rb sufficient to diagnose an abnormality of the detection electrode can be calculated. Thus, for example, when the detection electrode is corroded or foreign matter is adhered to the detection electrode to increase the resistance value, it is possible to lower the signal level (voltage value) of the flow rate signal output by each of the detection electrode 1A and the detection electrode 1B by lowering the signal levels (current values) of the AC signal IA and the AC signal IB. Thus, it is possible to prevent an unnecessarily high flow rate signal from being output. Further, by lowering the signal levels (current values) of the AC signal IA and the AC signal IB, it is possible to prevent corrosion of at least either of the detection electrode 1A or the detection electrode 1B from progressing by causing excess AC current to flow between the detection electrode 1A or the detection electrode 1B and the ground electrode 1E, for example, in a case in which strongly corrosive liquid flows in the measurement pipe 1P.

The processor 6 outputs the current control signal CC for performing control so that the AC signal generation circuit 11A and the AC signal generation circuit 11B output the AC signal IA and the AC signal IB at the determined signal levels (current values), to the current control circuit 20A corresponding to the AC signal generation circuit 11A and the current control circuit 20B corresponding to the AC signal generation circuit 11B.

When an abnormality of the detection electrode 1A is diagnosed in the electromagnetic flow meter 200, the current control circuit 20A sets the corresponding AC signal generation circuit 11A so that the AC current Ia of the AC signal IA output by the corresponding AC signal generation circuit 11A becomes a current value indicated by the current control signal CC output from the processor 6. Further, when an abnormality of the detection electrode 1B is diagnosed in the electromagnetic flow meter 200, the current control circuit 20B sets the corresponding AC signal generation circuit 11B so that the AC current Ib of the AC signal IB output by the corresponding AC signal generation circuit 11B becomes a current value indicated by the current control signal CC output from the processor 6. Each of the current control circuit 20A and the current control circuit 20B may be configured to be included as a component of the corresponding AC signal generation circuit 11A or AC signal generation circuit 11B.

The AC signal generation circuit 11A and the AC signal generation circuit 11B are synchronous rectification circuits configured to be able to change a current value which has been predetermined in the AC signal generation circuit 10A and the AC signal generation circuit 10B included in the electromagnetic flow meter 100 of the first embodiment into the current value set by the current control circuit 20A or the current control circuit 20B. When an abnormality of the detection electrode 1A is diagnosed in the electromagnetic flow meter 200, the AC signal generation circuit 11A outputs the AC signal IA of current value=AC current Ia set by the current control circuit 20A at a frequency of the AC current timing signal TA output from the frequency division circuit 61 included in the processor 6, and causes an AC current of the AC current Ia to flow between the corresponding detection electrode 1A and the ground electrode 1E. Further, when an abnormality of the detection electrode 1B is diagnosed in the electromagnetic flow meter 200, the AC signal generation circuit 11B outputs the AC signal IB of current value=AC current Ib set by the current control circuit 20B at a frequency of the AC current timing signal TB output from the frequency division circuit 61 included in the processor 6, and causes an AC current of the AC current Ib to flow between the corresponding detection electrode 1B and the ground electrode 1E.

The AC signal (AC current) output by each of the AC signal generation circuit 11A and the AC signal generation circuit 11B is the same as in the AC signal generation circuit 10A and the AC signal generation circuit 10B included in the electromagnetic flow meter 100 of the first embodiment except that the signal level (current value) is different. Therefore, if the AC signal IA is output between the detection electrode 1A and the ground electrode 1E by the AC signal generation circuit 11A (if the AC current Ia flows), the electromotive force (voltage value) generated due to the liquid resistance RA of the liquid between the detection electrode 1A and the ground electrode 1E in the measurement pipe 1P is detected by the detection electrode 1A, and the detection electrode 1A outputs the flow rate signal VA of a magnitude (voltage value) of the detected electromotive force=detection voltage Va. Further, if the AC signal IB is output between the detection electrode 1B and the ground electrode 1E by the AC signal generation circuit 11B (if the AC current Ib flows), the electromotive force (voltage value) generated due to the liquid resistance RB of the liquid between the detection electrode 1B and the ground electrode 1E in the measurement pipe 1P is detected by the detection electrode 1B, and the detection electrode 1B outputs the flow rate signal VB of a magnitude (voltage value) of the detected electromotive force=detection voltage Vb.

In the electromagnetic flow meter 200, the normal measurement operation in which each of the AC signal generation circuit 11A and the AC signal generation circuit 11B does not output the AC signal (does not cause the AC current to flow), that is, the normal measurement operation of the electromagnetic flow meter 200 is the same as the normal measurement operation of the electromagnetic flow meter 100 of the first embodiment. That is, in the normal measurement operation of the electromagnetic flow meter 200, the electromotive force (voltage value) generated by the electrode resistance R1 of the liquid flowing between the detection electrode 1A and the detection electrode 1B in the measurement pipe 1P is detected by each of the detection electrode 1A and the detection electrode 1B, and each of the detection electrode 1A and the detection electrode 1B outputs a flow rate signal having a magnitude (voltage value) of the detected electromotive force.

Next, each of the operations in the electromagnetic flow meter 200 will be described. The normal measurement operation of the electromagnetic flow meter 200 is the same as in the electromagnetic flow meter 100 of the first embodiment. Further, the electrode diagnosis operation in the electromagnetic flow meter 200 can be considered to be the same as in the electromagnetic flow meter 100 of the first embodiment except that the signal levels (current values) of the AC signals (AC currents) output by the AC signal generation circuit 11A and the AC signal generation circuit 11B are different. More specifically, in the electromagnetic flow meter 200, it is possible to diagnose the abnormality of the detection electrode by causing the AC current Ia of the AC signal IA output by the AC signal generation circuit 11A and the AC current Ib of the AC signal IB output by the AC signal generation circuit 11B to have the current value set by the corresponding current control circuit 20A or current control circuit 20B and operating similarly to the operation of the electromagnetic flow meter 100 described with reference to FIGS. 2 and 3 to perform the calculation process. Therefore, detailed description of the normal measurement operation and the electrode diagnosis operation of the electromagnetic flow meter 100 will be omitted. The determination conditions in the electrode diagnosis operation of the electromagnetic flow meter 200 can be considered to be the same as the determination conditions in the electrodes diagnosis operation of the electromagnetic flow meter 100 of the first embodiment.

As described above, in the electromagnetic flow meter 200 of the second embodiment, each of the AC signal generation circuit 11A corresponding to the detection electrode 1A and the AC signal generation circuit 11B corresponding to the detection electrode 1B outputs the AC signal, and the differential amplification circuit 3 removes the noise of the in-phase component by obtaining the difference between the respective flow rate signals output from the detection electrode 1A and the detection electrode 1B and calculates the electrode resistance R, similar to the electromagnetic flow meter 100 of the first embodiment. Accordingly, also in the electromagnetic flow meter 200 of the second embodiment, it is possible to diagnose an abnormality of at least either of the detection electrode 1A or the detection electrode 1B, more accurately than in the electromagnetic flow meter of the related art, similar to the electromagnetic flow meter 100 of the first embodiment. In the electromagnetic flow meter 200 of the second embodiment, it is possible to individually diagnose the abnormality of the detection electrode 1A and the detection electrode 1B with high accuracy and specify an abnormal detection electrode, similar to the electromagnetic flow meter 100 of the first embodiment.

Further, in the electromagnetic flow meter 200 of the second embodiment, it is possible to set (change) the signal level (current value) of the AC signal (AC current) output between the detection electrode 1A or the detection electrode 1B and the ground electrode 1E. Thus, in the electromagnetic flow meter 200 of the second embodiment, it is possible to diagnose an abnormality of each of the detection electrodes at the appropriate signal level (current value) according to a situation of the electrode diagnosis operation.

In the electromagnetic flow meter 200 of the second embodiment, it is preferable for the electrode diagnosis operation of diagnosing an abnormality of the respective detection electrodes to be performed in a short time. That is, in the electromagnetic flow meter 200 of the second embodiment, it is preferable for the normal measurement operation and the electrode diagnosis operation to be performed in a regular short time at predetermined period intervals or in a short time according to a manual operation of an operator who performs checking work in a plant, instead of the normal measurement operation and the electrode diagnosis operation being simultaneously performed as in the electromagnetic flow meter 100 of the first embodiment. In the electromagnetic flow meter 200 of the second embodiment, when the normal measurement operation and the electrode diagnosis operation are simultaneously performed, it is possible to set the signal level (current value) of the AC signal (AC current) output between the detection electrode 1A or the detection electrode 1B and the ground electrode 1E to a low current value except when necessary, similarly to the electromagnetic flow meter 100 of the first embodiment. This is because this is considered to be one means for preventing an abnormality of the detection electrode 1A or the detection electrode 1B from progressing due to the output AC signal (AC current) by setting the signal level (current value) of the AC signal (AC current) output between the detection electrode 1A or the detection electrode 1B and the ground electrode 1E to a high current value.

In the electromagnetic flow meter 200 of the second embodiment, the configuration for generating the timing signals (the excitation current timing signal TEX, the AC current timing signal TA, and the AC current timing signal TB) output to the excitation circuit 5, the AC signal generation circuit 11A, and the AC signal generation circuit 11B or the configuration for outputting the AC signal (AC current) corresponding to each of the detection electrode 1A and the detection electrode 1B is not limited to the configuration illustrated in FIG. 4, similar to the electromagnetic flow meter 100 of the first embodiment. Further, in the electromagnetic flow meter 200 of the second embodiment, a configuration in which the result of the calculation process performed in the processor 6 (the fluid velocity of the liquid flowing in the measurement pipe 1P or the result of diagnosing an abnormality of at least either of the detection electrode 1A or the detection electrode 1B) is displayed, for example, on a display unit included in the electromagnetic flow meter 200 may be adopted, similar to the electromagnetic flow meter 100 of the first embodiment.

Further, in the electromagnetic flow meter 200 of the second embodiment, the number of detection electrodes included in the electromagnetic flow meter 200 is not limited to the number illustrated in FIG. 4, and a concept of diagnosing an abnormality of each of the detection electrodes in the electromagnetic flow meter 200 can be applied to the configuration of an electromagnetic flow meter having more detection electrodes, similar to the electromagnetic flow meter 100 of the first embodiment.

As described above, according to the embodiments of the present invention, the electromagnetic flow meter includes the AC signal generation circuit that outputs the AC signal (AC current) with a predetermined current value between each of the detection electrodes that detect the electromotive force (voltage) generated by fluid flowing in the measurement pipe and the ground electrode. In the embodiments of the present invention, in the diagnosis operation of diagnosing an abnormality of the detection electrode, the electrode resistance is calculated based on the flow rate signal after removing the noise of the in-phase component by obtaining the difference between the flow rate signals output by the respective detection electrodes using the differential amplification circuit, similar to the normal measurement operation. Accordingly, in the electromagnetic flow meter of the embodiments of the present invention, it is possible to diagnose the abnormality of each of the detection electrodes more accurately than in the electromagnetic flow meter of the related art. Further, in the embodiments of the present invention, even when an abnormality of the respective detection electrodes is individually diagnosed, the electrode resistance is calculated for each of the detection electrodes based on the flow rate signal after removing the noise of the in-phase component. Thus, in the electromagnetic flow meter of the embodiments of the present invention, it is possible to specify an abnormal detection electrode more accurately than in the electromagnetic flow meter of the related art.

Further, in the embodiments of the present invention, the current control circuit for changing the current value of the AC signal (AC current) that the AC signal generation circuit outputs between the corresponding detection electrode and the ground electrode into a current value with which a sufficient flow rate signal required for calculation of the electrode resistance is output from the respective detection electrodes is provided. Thus, in the embodiments of the present invention, it is possible to calculate the electrode resistance more accurately by avoiding interference factors when the electrode resistance is calculated, and diagnose the abnormality of each of the detection electrodes.

Further, in the embodiments of the present invention, a determination condition for diagnosing (determining) an abnormality using the calculated electrode resistance is set in each state in which the respective detection electrodes become abnormal. Thus, in the embodiments of the present invention, it is possible to diagnose (determine) an abnormality caused by various states in the respective detection electrodes.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An electromagnetic flow meter that measures velocity of fluid that is a measurement target flowing in a magnetic field formed inside a measurement pipe, the electromagnetic flow meter comprising:
a first detection electrode that detects electromotive force generated by the fluid to output a first flow rate signal having a magnitude of the detected electromotive force, and a second detection electrode that detects electromotive force generated by the fluid to output a second flow rate signal having a magnitude of the detected electromotive force;
a differential circuit that outputs a differential flow rate signal obtained by obtaining a difference between the first flow rate signal and the second flow rate signal;
an AC signal generation circuit that causes a first AC current to flow between the first detection electrode and a ground electrode and causes a second AC current with a reverse phase at the same frequency as that of the first AC current to flow between the second detection electrode and the ground electrode; and
a diagnosis unit that calculates a first resistance value between the first detection electrode and the second detection electrode based on the differential flow rate signal from the first flow rate signal and the second flow rate signal output in a state in which the first AC current and the second AC current are caused to flow, and diagnoses an abnormality of at least either of the first detection electrode or the second detection electrode based on the calculated first resistance value.

2. The electromagnetic flow meter according to claim 1, wherein the diagnosis unit includes a timing signal generation unit that outputs an excitation current timing signal indicating a frequency of an excitation current output by an excitation circuit that forms the magnetic field in the measurement pipe, a first AC current timing signal indicating a frequency of the first AC current, and a second AC current timing signal indicating a frequency of the second AC current, and
the frequency of the first AC current timing signal and the second AC current timing signal is an integer multiple of the frequency of the excitation current timing signal.

3. The electromagnetic flow meter according to claim 1, wherein the diagnosis unit includes a timing signal generation unit that outputs an excitation current timing signal indicating a frequency of an excitation current output by an excitation circuit that forms the magnetic field in the measurement pipe, and a first AC current timing signal indicating a frequency of the first AC current,
the AC signal generation circuit causes the first AC current at a frequency expressed by the first AC current timing signal to flow between the first detection electrode and the ground electrode, and causes the second AC current with a reverse phase at the same frequency as a frequency expressed by the first AC current timing signal to flow between the second detection electrode and the ground electrode, and
a frequency of the first AC current timing signal is an integer multiple of the frequency of the excitation current timing signal.

4. The electromagnetic flow meter according to claim 1, wherein the diagnosis unit diagnoses an abnormality of at least one of the first detection electrode and the second detection electrode based on a first resistance value difference that is a difference between the first resistance value calculated in an installation step of the electromagnetic flow meter and the first resistance value calculated in an operation step of the electromagnetic flow meter.

5. The electromagnetic flow meter according to claim 4, wherein the diagnosis unit determines that at least either of the first detection electrode or the second detection electrode is abnormal when the first resistance value difference is smaller than a predetermined threshold.

6. The electromagnetic flow meter according to claim 1, wherein the diagnosis unit
calculates a second resistance value corresponding to the first detection electrode based on the differential flow rate signal from the first flow rate signal and the second flow rate signal output in a state in which only the first AC current is caused to flow,
calculates a third resistance value corresponding to the second detection electrode based on the differential flow rate signal from the first flow rate signal and the second flow rate signal output in a state in which only the second AC current is caused to flow, and
performs at least one of diagnosis of an abnormality of the first detection electrode based on the second resistance value and diagnosis of an abnormality of the second detection electrode based on the third resistance value.

7. The electromagnetic flow meter according to claim 6, wherein the diagnosis unit performs at least one of diagnosis of an abnormality of the first detection electrode based on a second resistance value difference that is a difference between the second resistance value calculated in an installation step of the electromagnetic flow meter and the second resistance value calculated in an operation step of the electromagnetic flow meter and diagnosis of an abnormality of the second detection electrode based on a third resistance value difference that is a difference between the third resistance value calculated in the installation step and the third resistance value calculated in the operation step.

8. The electromagnetic flow meter according to claim 7, wherein the diagnosis unit determines that the second detection electrode is abnormal when the second resistance value difference is within a predetermined range and the third resistance value difference is smaller than a predetermined threshold value.

9. The electromagnetic flow meter according to claim 7, wherein the diagnosis unit determines that the first detection electrode is abnormal when the second resistance value difference is smaller than a predetermined threshold value and the third resistance value difference is within a predetermined range.

10. The electromagnetic flow meter according to claim 6, wherein the diagnosis unit diagnoses an abnormality of the first detection electrode or the second detection electrode using a combination of a first operation resistance value that is the first resistance value calculated in the operation step of the electromagnetic flow meter, a second operation resistance value that is the second resistance value calculated in the operation step, and a third operation resistance value that is the third resistance value calculated in the operation step.

11. The electromagnetic flow meter according to claim 10, wherein the diagnosis unit determines that the first detection electrode is abnormal in any one of
a case in which half the first operation resistance value is greater than the second operation resistance value,
a case in which a difference between the first operation resistance value and the third operation resistance value is within a predetermined range, and
a case in which a difference between the second operation resistance value and the third operation resistance value is smaller than a predetermined threshold value.

12. The electromagnetic flow meter according to claim 10, wherein the diagnosis unit determines that the second detection electrode is abnormal in any one of
a case in which half the first operation resistance value is greater than the third operation resistance value,
a case in which a difference between the first operation resistance value and the second operation resistance value is within a predetermined range, and
a case in which a difference between the second operation resistance value and the third operation resistance value is greater than a predetermined threshold value.

13. An electromagnetic flow meter that measures velocity of fluid that is a measurement target flowing in a magnetic field formed inside a measurement pipe, the electromagnetic flow meter comprising:
a first detection electrode that detects electromotive force generated by the fluid to output a first flow rate signal having a magnitude of the detected electromotive force, and a second detection electrode that detects electromotive force generated by the fluid to output a second flow rate signal having a magnitude of the detected electromotive force;
a differential circuit that outputs a differential flow rate signal obtained by obtaining a difference between the first flow rate signal and the second flow rate signal;
an AC signal generation circuit that causes a first AC current to flow between the first detection electrode and a ground electrode and causes a second AC current with a reverse phase at the same frequency as that of the first AC current to flow between the second detection electrode and the ground electrode; and
a diagnosis unit that calculates a first resistance value corresponding to the first detection electrode based on the differential flow rate signal from the first flow rate signal and the second flow rate signal output in a state in which only the first AC current is caused to flow, calculates a second resistance value corresponding to the second detection electrode based on the differential flow rate signal from the first flow rate signal and the second flow rate signal output in a state in which only the second AC current is caused to flow, and performs at least one of diagnosis of an abnormality of the first detection electrode based on the first resistance value and diagnosis of an abnormality of the second detection electrode based on the second resistance value.

* * * * *